United States Patent [19]
Yasutake et al.

[11] Patent Number: 5,432,974
[45] Date of Patent: Jul. 18, 1995

[54] CAR WASHING MACHINE

[75] Inventors: Nobuo Yasutake; Akira Ikari; Masamoto Ueda, all of Shiga, Japan

[73] Assignee: Daifuku Co., Ltd., Osaka, Japan

[21] Appl. No.: 261,330

[22] Filed: Jun. 16, 1994

[30] Foreign Application Priority Data

| Jul. 20, 1993 | [JP] | Japan | 5-178645 |
| Aug. 11, 1993 | [JP] | Japan | 5-198711 |
| Aug. 11, 1993 | [JP] | Japan | 5-198713 |
| Dec. 6, 1993 | [JP] | Japan | 5-304499 |

[51] Int. Cl.$^6$ .................................................. B60S 3/06
[52] U.S. Cl. .............................. 15/316.1; 15/DIG. 2; 15/53.3; 134/123; 198/339.1
[58] Field of Search ............ 15/53.1, 53.2, 53.3, 15/53.4, 97.3, DIG. 2, 316.1, 312.1; 134/123, 43; 104/162, 163, 165, 172.1, 172.3, 172.4, 172.5; 34/229; 198/339.1, 345.1, 345.2

[56] References Cited

U.S. PATENT DOCUMENTS

| 2,862,222 | 12/1958 | Cockrell | 15/DIG. 2 |
| 3,037,223 | 6/1962 | Lovsey | 15/53.3 |
| 3,332,098 | 7/1967 | Smith | 15/53.3 |
| 3,362,349 | 1/1968 | Kirkland | 15/DIG. 2 |
| 3,391,700 | 7/1968 | Lawter | 15/DIG. 2 |
| 3,559,225 | 2/1971 | Gougoulas | 15/DIG. 2 |
| 3,596,606 | 8/1971 | Smith, Jr. | 104/172.3 |
| 3,681,805 | 8/1972 | Shelstad et al. | 104/172.3 |
| 3,861,324 | 1/1975 | Shelstad | 104/172.3 |
| 3,930,276 | 1/1976 | Van Brakel | 104/172.3 |
| 3,934,296 | 1/1976 | Hanna | 15/53.3 |
| 3,934,297 | 1/1976 | Hanna | 15/53.3 |
| 4,024,598 | 5/1977 | Miner | 15/53.2 |
| 4,513,467 | 4/1985 | Roncaglione | 15/53.3 |
| 4,550,464 | 11/1985 | Messing | 15/DIG. 2 |
| 4,559,721 | 12/1985 | Hanna | 15/316.1 |

FOREIGN PATENT DOCUMENTS

| 0134033 | 8/1984 | Japan | 15/DIG. 2 |
| 3-90456 | 4/1991 | Japan | |
| 686716 | 1/1953 | United Kingdom | 134/123 |

Primary Examiner—Edward L. Roberts, Jr.
Attorney, Agent, or Firm—Barnes, Kisselle, Raisch, Choate, Whittemore & Hulbert

[57] ABSTRACT

A car washing machine having a tunnel-shaped stationary car washing machine body (1) installed on the floor (2) and adapted to continuously wash a vehicle (2) as the latter is transported by a pair of roller conveyors (7a, 7b). The car washing machine body (1) has a washing section (3) in the front region thereof, a waxing section (4) in the intermediate region thereof and a drying section (5) in the rear region thereof. The roller conveyors (7a, 7b) are designed so that one conveyor (7b) supports the wheels (8b, 9b) on one side of the vehicle (1), while the other conveyor (7a) supports the wheels (8a, 9a) on the other side of the vehicle (1), the vehicle (1) being guided with one conveyor (7b) serving as a reference.

17 Claims, 42 Drawing Sheets

FIG.3
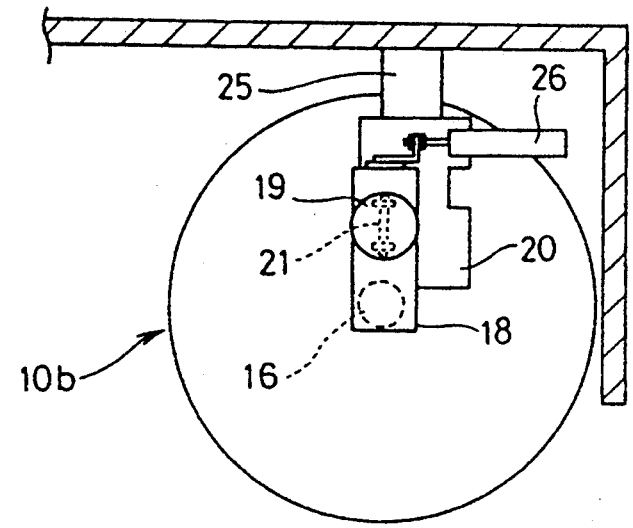
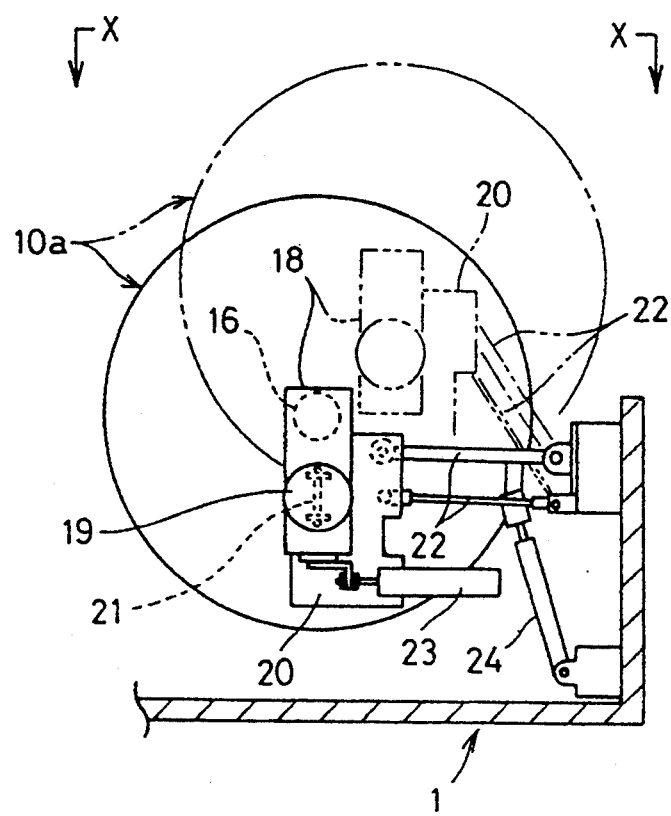

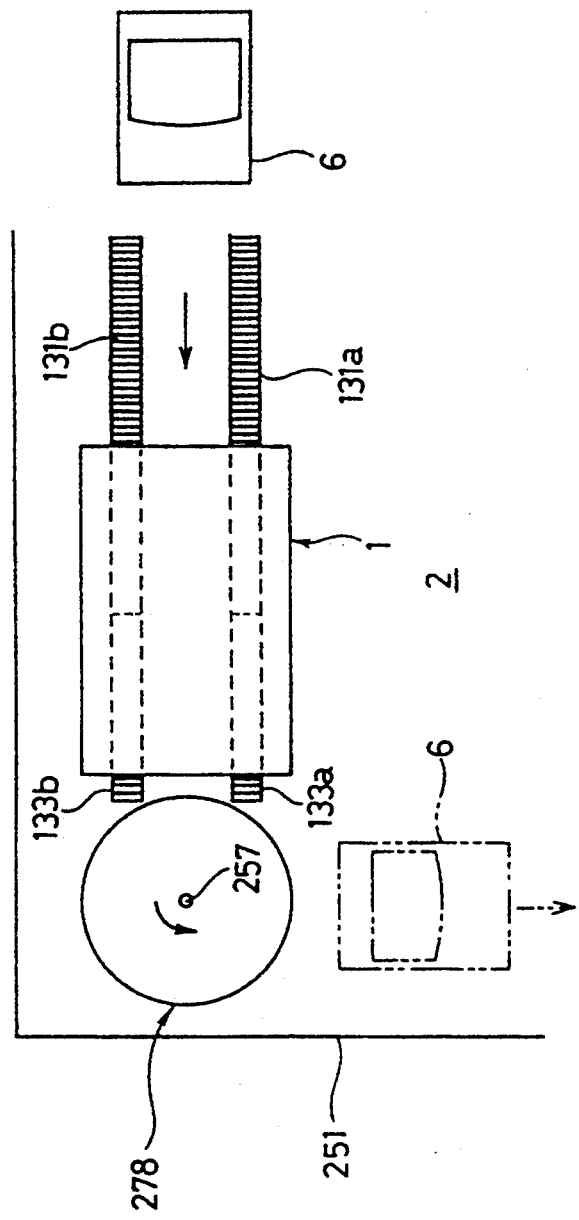

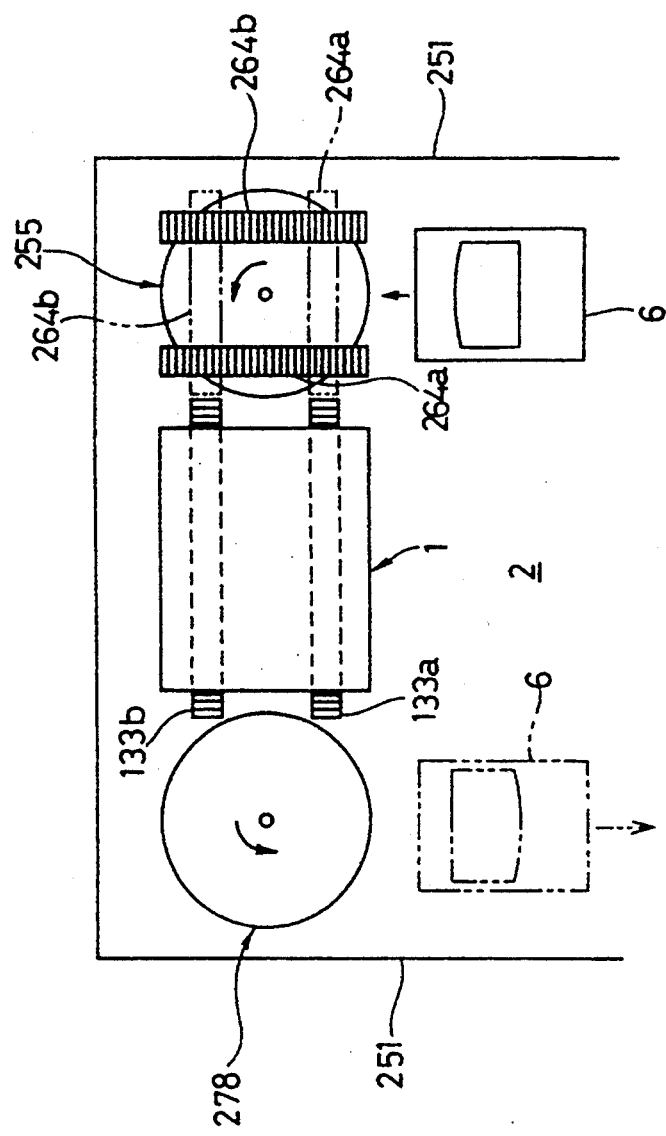

CAR WASHING MACHINE

FIELD OF THE INVENTION

The present invention relates to a car washing machine designed to wash a vehicle while transporting the latter by a transporting device.

BACKGROUND OF THE INVENTION

A known car washing machine, as shown, for example, in Japanese Laid-open Unexamined Patent Application No. 3-90456 (1991), comprises a car washing machine body installed on a floor, and a washing section, a waxing section, a drying section, and a vehicle transporting section for transporting a vehicle to be washed forwardly from the inlet port of the car washing machine body into the car washing machine body and for transporting the vehicle rearwardly from the outlet port of the car washing machine body by way of acting on the wheels on one side of the vehicle, each section being successively disposed starting at the front in the order mentioned.

The washing section comprises a pair of front brushes and a pair of rear brushes for washing the opposite lateral surfaces of a vehicle, a pair of rocker brushes for washing the lower regions of the opposite lateral surfaces of the vehicle and the lateral surfaces of the wheels, and a top brush for washing the upper surface of the vehicle.

Further, the vehicle transporting device comprises a first sprocket disposed at the inlet side of the car washing machine body, a second sprocket disposed at the outlet side of the car washing machine body, a chain entrained around the first and second sprockets, vehicle transport rollers disposed at predetermined intervals on the chain and adapted to rotatably abut against the wheels of the vehicle to advance the vehicle, roller storing means for storing said vehicle transport rollers below the floor surface before said vehicle transport rollers reach the second sprocket.

And a tire guide is disposed on the floor laterally along a wheel guide passage for moving wheel transport rollers in order to guide the wheels on one side of the vehicle from outside the wheels along the vehicle transport path so as to prevent the wheels from deviating from the path. A wheel guide passage extending along the vehicle transport path is defined between the tire guide and the chain.

According to the above arrangement, after a front wheel on one side of a vehicle to be washed have been positioned on the wheel guide passage, the motor of the vehicle transport device is driven to rotate the chain to cause the vehicle transport rollers nearest the front wheel to abut against the front wheels, said front wheel being pushed by the vehicle transport rollers; thus, the front and rear wheels run idle and the vehicle is advanced at a constant speed. At the same time, the wheels on one side are guided by the tire guide and prevented from deviating from the path. In this manner, the vehicle is washed in the washing section, waxed in the waxing section, and dried in the drying section. In this case, in the washing section, the vehicle is washed at its opposite lateral surfaces by the four brushes, i.e., the pair of front brushes and the pair of rear brushes, at the lower regions of its opposite lateral surfaces and the lateral surfaces of the wheels by the pair of rocker brushes, and at its upper surface by the top brush. And when the vehicle reaches the outlet port of the car washing machine body, the vehicle transport rollers which are pushing the front wheels are separated from the front wheels and stored in the space of the roller storing means. By this, this vehicle loses a pushing force and stops advancing. Afterwards, the following vehicle transport rollers reach and abut against the rear wheel of the vehicle on one side giving a pushing force to the vehicle, so that the vehicle is advanced again and pushed out of the car washing machine body. In addition, if the side brakes of the vehicle are actuated or the transmission gear is shifted to a driving or parking position in an automatic transmission system, the rear wheels are locked and hence do not run idle; thus, for the reason that troubles occur during transport of the vehicle, the parking brakes are released or the neutral position is selected so as to free all the wheels.

However, in the arrangement of the known car washing machine describe above, during the transport of the vehicle, the side brakes of the vehicle are released and the front and all the wheels are freed; therefore, the following problems accompany:

a. The conditions of the floor (slopes in the front-and-rear and right-and-left directions) and the reactions of the brushes during the car washing process may cause the vehicle to move unexpectedly, hindering the expected car washing from being smoothly carried out.

b. At the outlet port where the floor is sloped for the sake of drainage, there may be such a danger that the vehicle which has been washed is caused to run by itself by said slope of the floor.

c. A vehicle is washed as being transported with all its wheel rotating so that the vehicle moves in the right-and-left wheeling directions thereof. Therefore, tire guides corresponding to the width of tires of each vehicle need be provided. However, since there are a variety of tire width depending on the different sizes of vehicles, it is almost impossible to change the tire guide each time. Therefore, it cannot be helped but the medium-width tire guide is used in most cases.

d. When a vehicle having narrow-width tires is advanced on the medium-width tire guide, the wheels of the vehicle move right and left in the range of the width of the guide, occasionally jumping out of the tire guide. In addition, the wheel covers might be damaged by colliding against the tire guide. Furthermore, there might arise such a trouble that the chains be broken in contact with the wheels.

e. As a result of fixing the tire guide at the medium width, vehicles having wheels of wider width cannot be washed, thus limiting the kinds of vehicles to be washed.

f. If the car washing machine has gone out of order, a vehicle halfway in the washing process needs somehow to be passed through a transport passage, which, however, is not easy because the vehicle has to pass over the vehicle transport rollers.

g. If the parking brakes are actuated by mistake due to a driver's habit or any other reasons, the rear wheels are locked and do not rotate, which causes vehicle-transportational problems such that the proceeding vehicle is left behind and then collided against by the following vehicle, or the locked rear wheels are forced to slide along the floor and worn out under friction.

Furthermore, since the vehicle is halted from advancing for some time and then started again to advance, the following problem accompanies:

h. For a certain period of time while the vehicle is halted from advancing, a certain part of the vehicle body is subjected to local spray watering from a water spray nozzle or a top blow nozzle, causing an unfavorable uneven washing.

SUMMARY OF THE INVENTION

Accordingly, the present invention solves these problems and has for its object the provision of a car washing machine capable of washing a vehicle while supporting and transporting the vehicle with its wheels locked.

To achieve said object, the invention provides a car washing machine comprising a tunnel-shaped stationary car washing machine body installed on a floor, a washing section disposed in the front region of said car washing machine body, a waxing section disposed in the intermediate region, a drying section disposed in the rear region, and a pair of juxtaposed conveyors disposed on the floor for transporting a vehicle to be washed from the front into the car washing machine body and for transporting the vehicle rearwardly from the outlet port of the car washing machine body, one conveyor supporting the wheels on one side of the vehicle, the other conveyor supporting the wheels on the other side of the vehicle, thus guiding the vehicle for transport by using one conveyor as a reference.

According to such arrangement, the driver applies the parking brakes or shifts the transmission gear to a parking position, so that with the rear wheels locked, the vehicle is washed by each section means for washing, waxing and drying while being transported by the pair of conveyors. Since the rear wheels are locked during transport in this manner, the vehicle is prevented from being accidentally displaced in spite of the conditions of the floor (slopes in the front-and-rear and right-and-left directions) or the reactions of the brushes during the car washing process. As a result, the expected car washing is performed each time without a hitch.

Afterwards, the vehicle which has reached the terminal end of the conveyors is further transported rearward. Since the rear wheels are locked then, the vehicle which has been washed is not caused to run itself by the slopes at the outlet port. Afterwards, the rear wheels are unlocked enabling the vehicle to run forward.

Forward movement of the vehicle can be carried out continuously without a halt, so that the car washing means always work favorably without local working concentratedly on a specific portion of the vehicle. Further, in case the conveyors or the washing means break down, the vehicle can still be continued to advance with ease on the conveyors by unlocking the rear wheels.

In addition, since the rear wheels are locked, the vehicle reaching the terminal end of the conveyors is further transported rearward, whereby the front wheels of the vehicle are sent out from the conveyors and rotate on the floor. In this manner, the vehicle which has been washed stops with its front wheels positioned on the floor and the rear wheels on the conveyor side. Therefore, it is possible to start the vehicle with its wheel steered to the right or the left to go out from the outlet port, enabling the present car washing machine to be installed even where the space allotted outside of the outlet port is small.

BRIEF DESCRIPTION OF THE DRAWINGS

FIG. 3 is a plan view of swing brushes;

FIG. 43 is a plan view of a car washing machine according to another embodiment of the present invention; and FIG. 44 is a plan view of a car washing machine according to another embodiment of the present invention.

DESCRIPTION OF THE PREFERRED EMBODIMENTS

Figure 1:
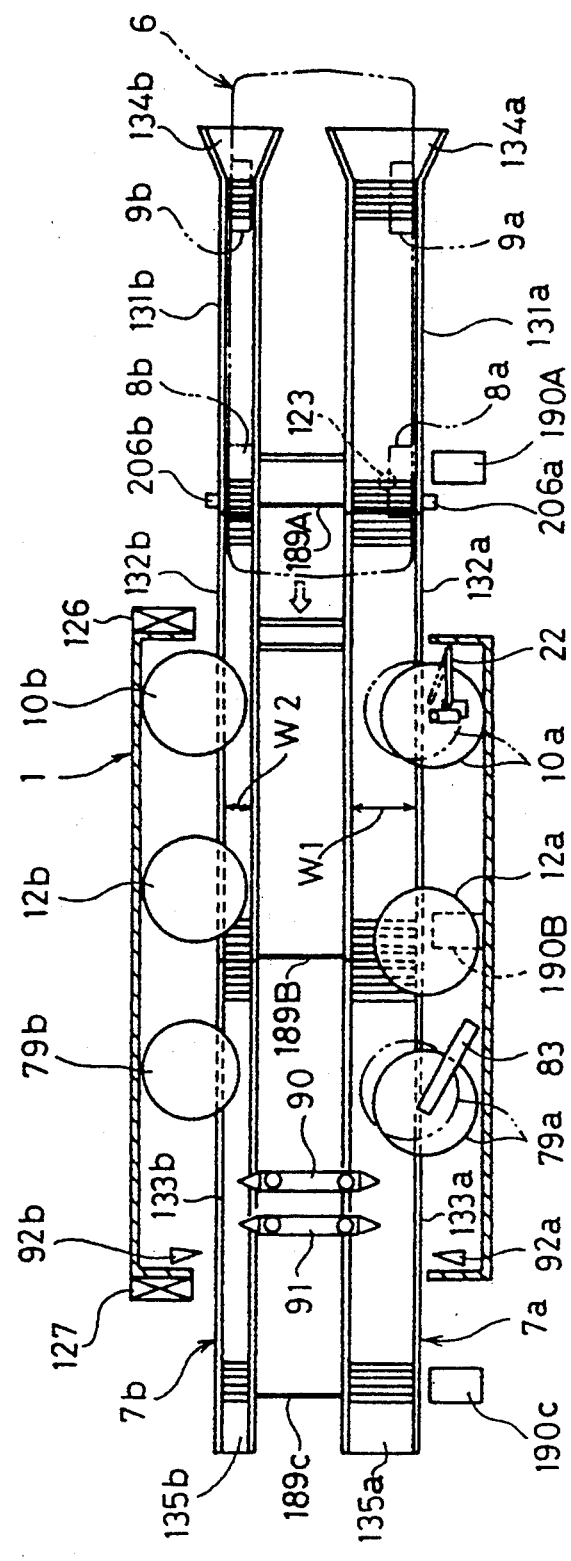
FIG. 1 is a fragmentary plan view showing the internal arrangement of a car washing machine body according to an embodiment of the present invention.
Figure 2:
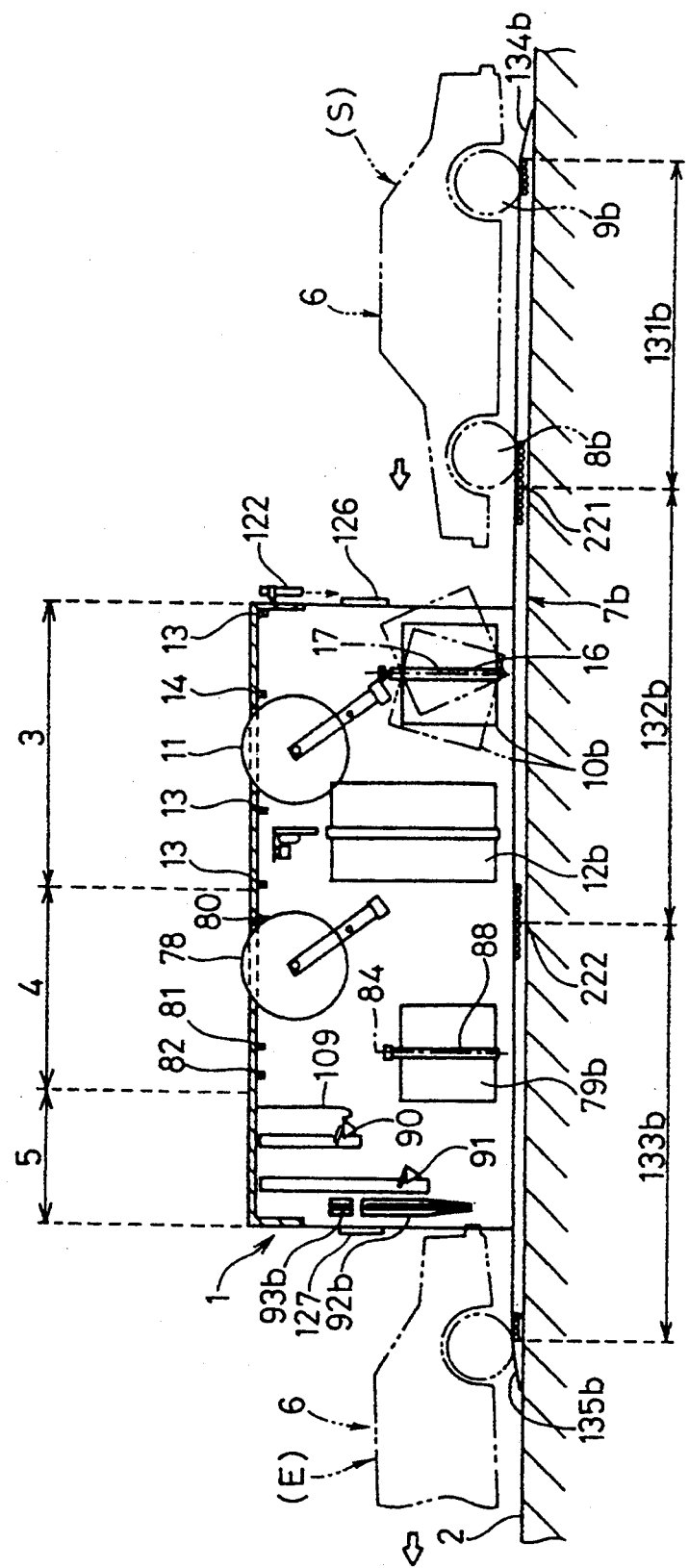
FIG. 2 is a fragmentary side view showing the internal arrangement of the car washing machine body.

As shown in FIGS. 1 and 2, the numeral 1 denotes a tunnel-shaped stationary car washing machine body installed on a floor surface 2. A washing section 3 is defined in the front region of the car washing machine body 1, a waxing section is defined in the intermediate region and a drying section 5 is defined in the rear region.

Further, a pair of roller conveyors 7a and 7b (an example of transport means) extending through the car washing machine body 1 is juxtaposed on the floor 2 to transport a vehicle 6 to be washed from the inlet port of the car washing machine body 1 into the latter and to transport it rearwardly from the outlet port of the car washing machine body 1.

In the washing section 3, there are a pair of swing brushes 10a and 10b, a liftable top brush 11, and a pair of side brushes 12a and 12b. Further, on the ceiling of the washing section 3, there are washing water spray nozzles 13 and a detergent spray nozzle 14.

The arrangement of the swing brushes 10a and 10b will now be described.

Figure 4:
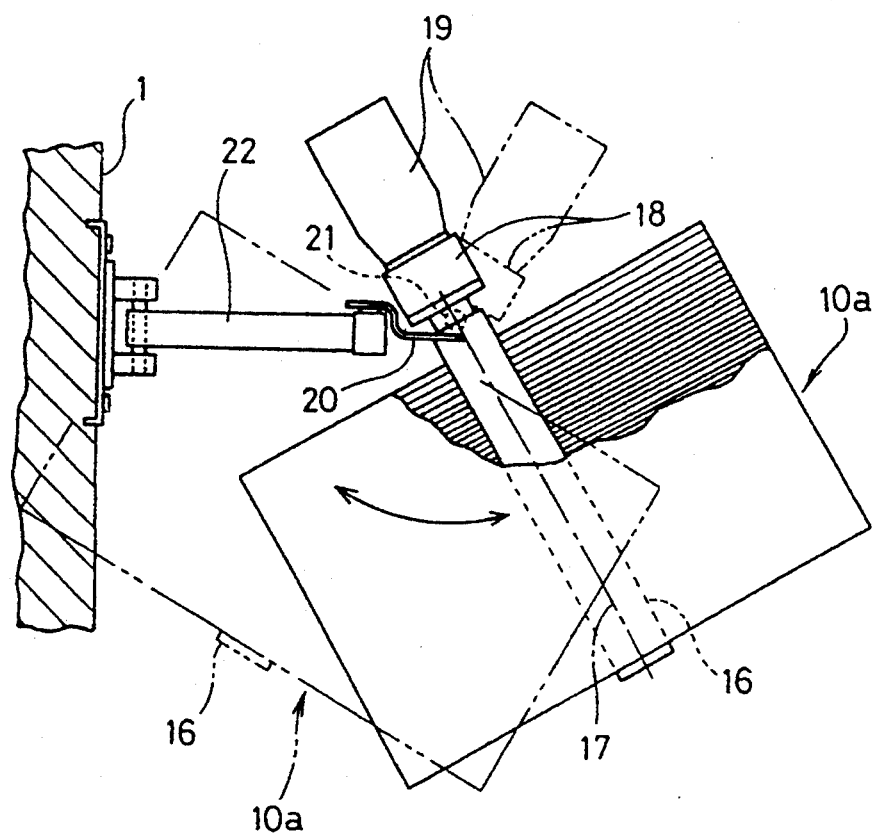
FIG. 4 is a view taken in the direction of arrow X—X in FIG. 3.

As shown in FIGS. 3 and 4, the rotatable shaft 16 of one swing brush 10a is supported for rotation around the vertical axis 17 by a support bracket 18 through a bearing. The support bracket 18 has a motor 19 attached thereto for rotating one swing brush 10a.

An attaching bracket 20 is disposed below the support bracket 18 and the latter is longitudinally swingably connected to said attaching bracket 20 by a connecting pin 21. The attaching bracket 20 is attached to the front ends of transversely swingable links 22 attached to the car washing machine body 1. In addition, the attaching bracket 20 is provided with a first cylinder 23 for longitudinally swinging the support bracket 18. The car washing machine body 1 is provided with a second cylinder 24 for transversely swinging the links 22.

Further, the other swing brush 10b is likewise supported by a support bracket 18, which is longitudinally swingably connected to an attaching bracket 20 through a connecting pin 21. The attaching bracket 20 is fixed to the frame 25 of the car washing machine body 1. The attaching bracket 20 is provided with a third cylinder 26 for transversely swinging the support bracket 18. In addition, the swing brushes 10a and 10b are increased in diameter and overall height as compared with conventional rocker brushes.

The arrangement of the side brushes 12a and 12b will now be described.

Figure 6:
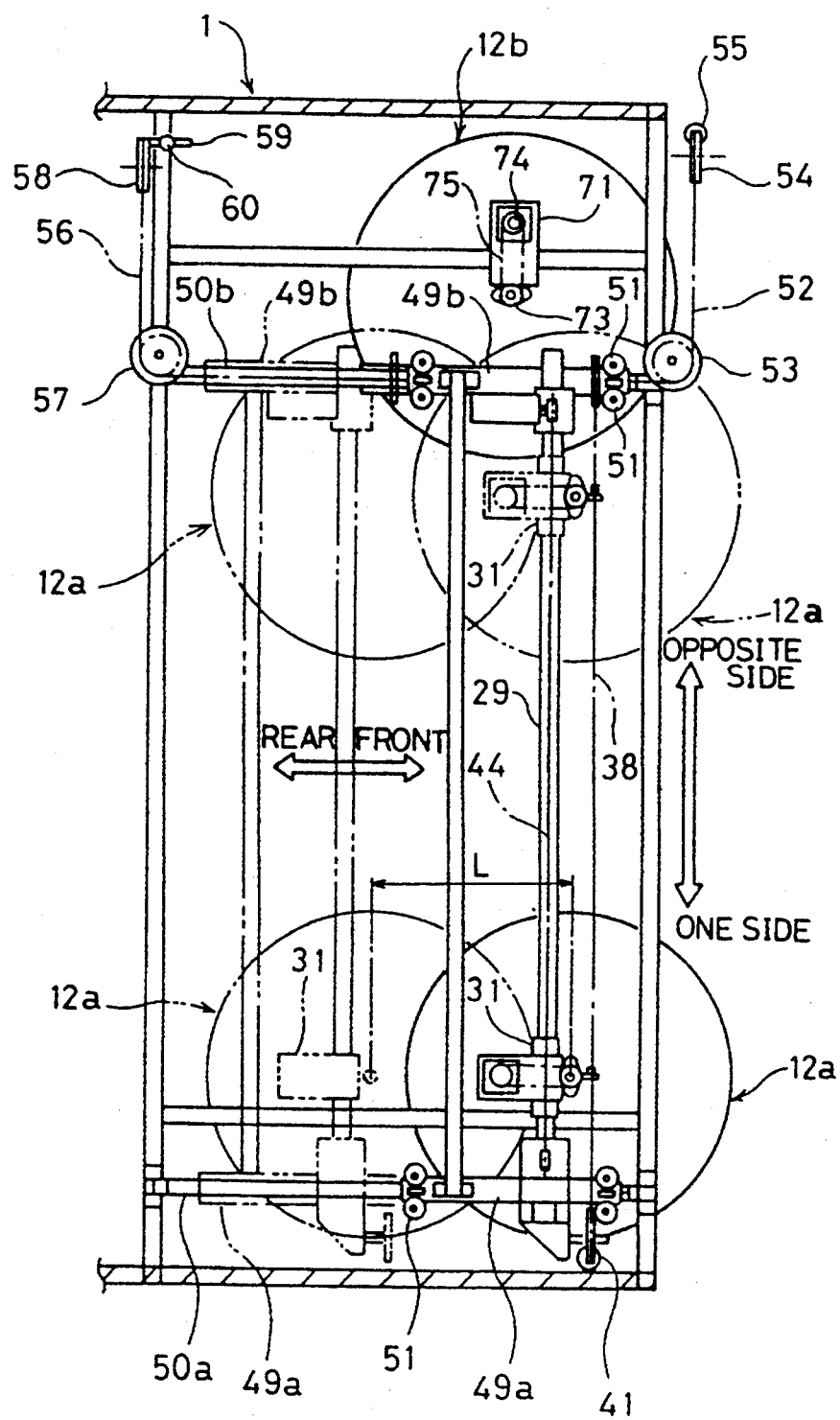
FIG. 6 is a plan view of side brushes.
Figure 9:
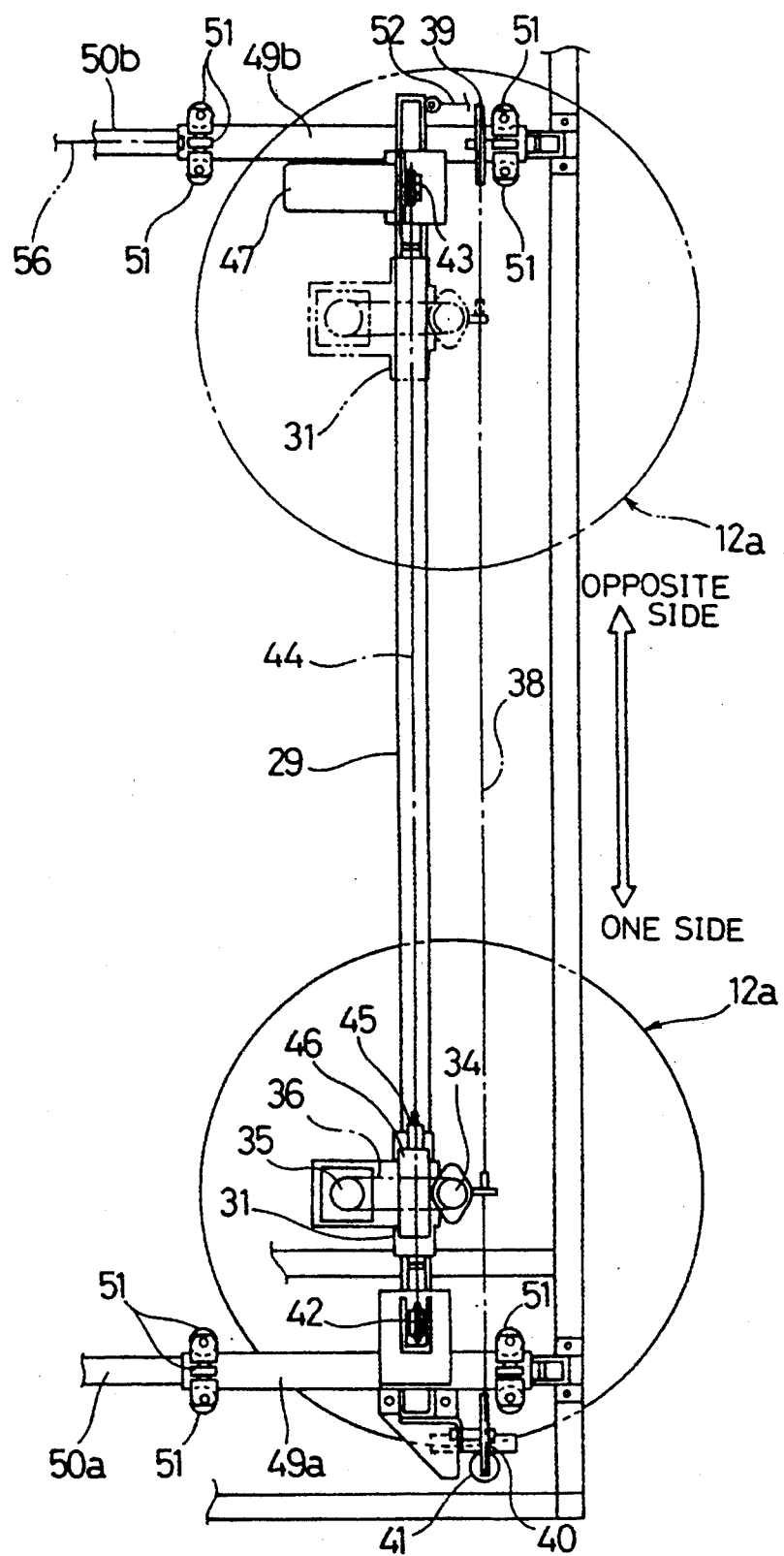
FIG. 9 is a plan view of a driving unit for side brushes on one side.
Figure 10:
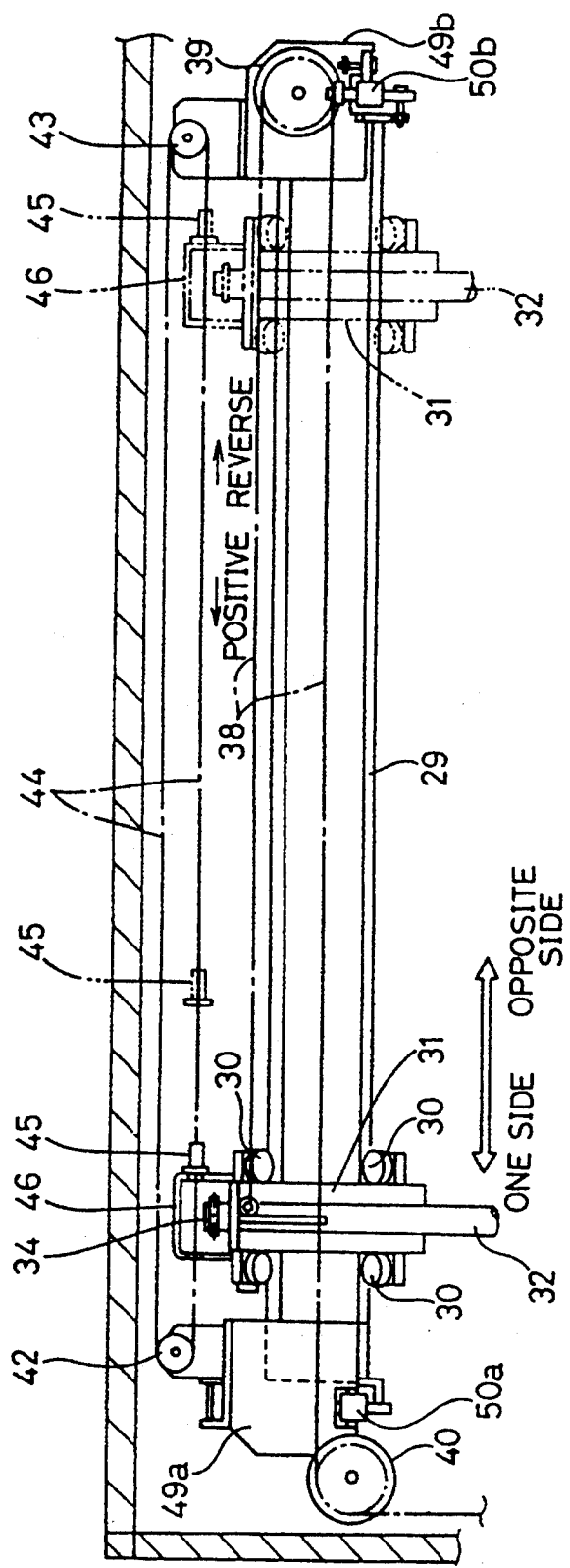
FIG. 10 is a front view of the driving unit for side brushes on one side.

As shown in FIG. 6, one side brush 12a is movable toward and away from the other opposed side brush 12b and is longitudinally movable within a given range. Further, the other side brush 12b is fixed to the car washing machine body 1. As shown in FIGS. 9 and 10, a first rail 29 transversely extends above one side brush 12a. A first movable body 31 guided by rollers 30 is mounted on said first rail 29. The upper end of the rotatable shaft 32 of said one side brush 12a is rotatably supported by the first movable body 31 through a bearing. The first movable body 31 is provided with a motor 33 (see FIG. 8) for rotating one side brush 12a, said motor 33 and the upper end of said rotatable shaft 32 being interconnected by sprockets 34 and 35 and a chain 36.

Figure 7:
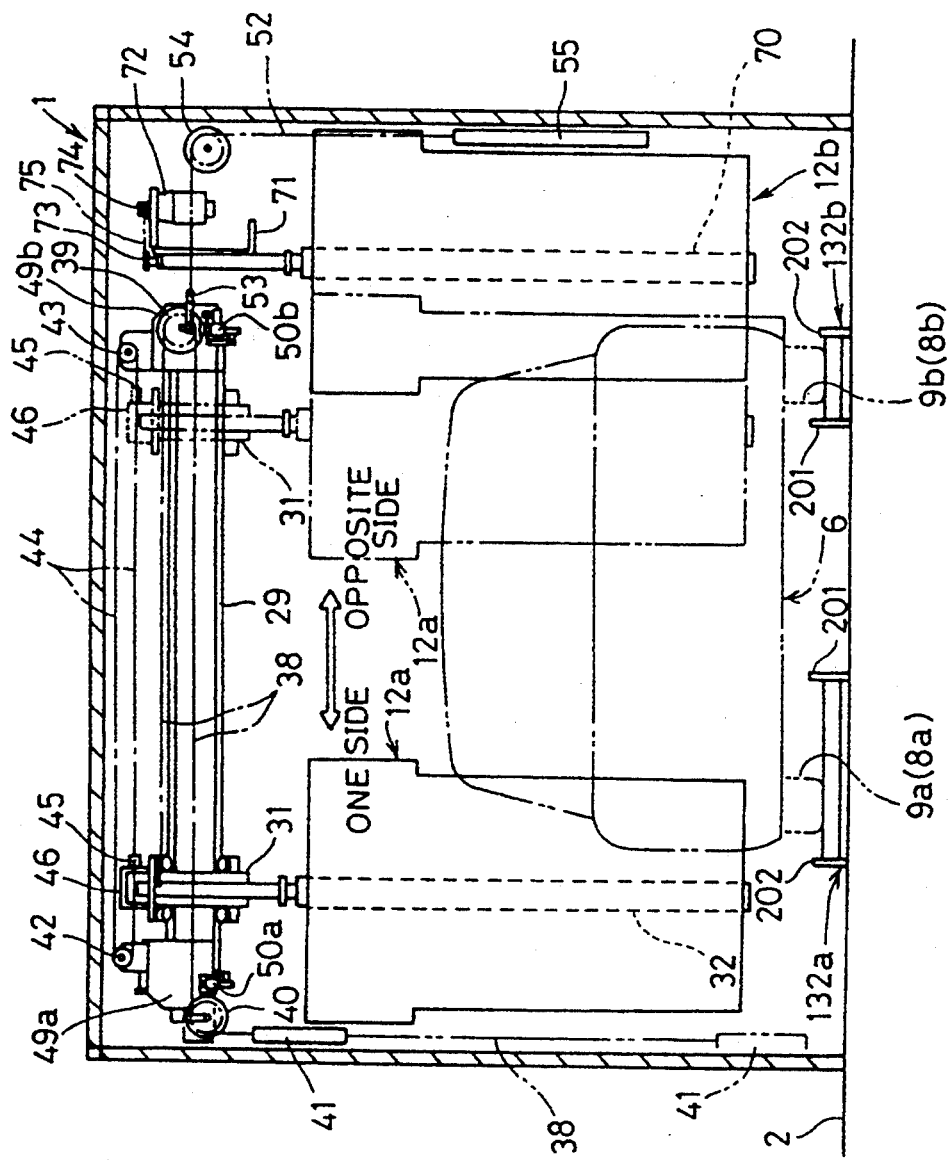
FIG. 7 is a front view of the side brushes.

A wire 38 is connected at one end thereof to said first movable body 31. This wire 38 extends to the other side along the first rail 29 and is reversed to one side by a pulley 39 attached to the other end of the first rail 29 and guided downward by a pulley 40 attached to one end of the first rail 29. And as shown in FIG. 7, a weight 41 is attached to the other end of the wire 38.

Further, as shown in FIG. 10, sprockets 42 and 43 are attached to the upper opposite ends of the first rail 29, with a chain 44 extending between and entrained around said sprockets 42 and 43. An engaging element 45 is attached to said chain 45 at a place thereon. The engaging element 45 is free to laterally engage and disengage an engaged element 46 installed in the upper region of the first movable body 31. A motor 47 for rotating the other sprocket 43 is attached to the other end of the first rail 29, as shown in FIG. 9. Further, second movable bodies 49a and 49b are installed on the lower regions of the opposite ends. These movable bodies 49a and 49b are supported and guided by a pair of second rails 50a and 50b through rollers 51.

Figure 8:
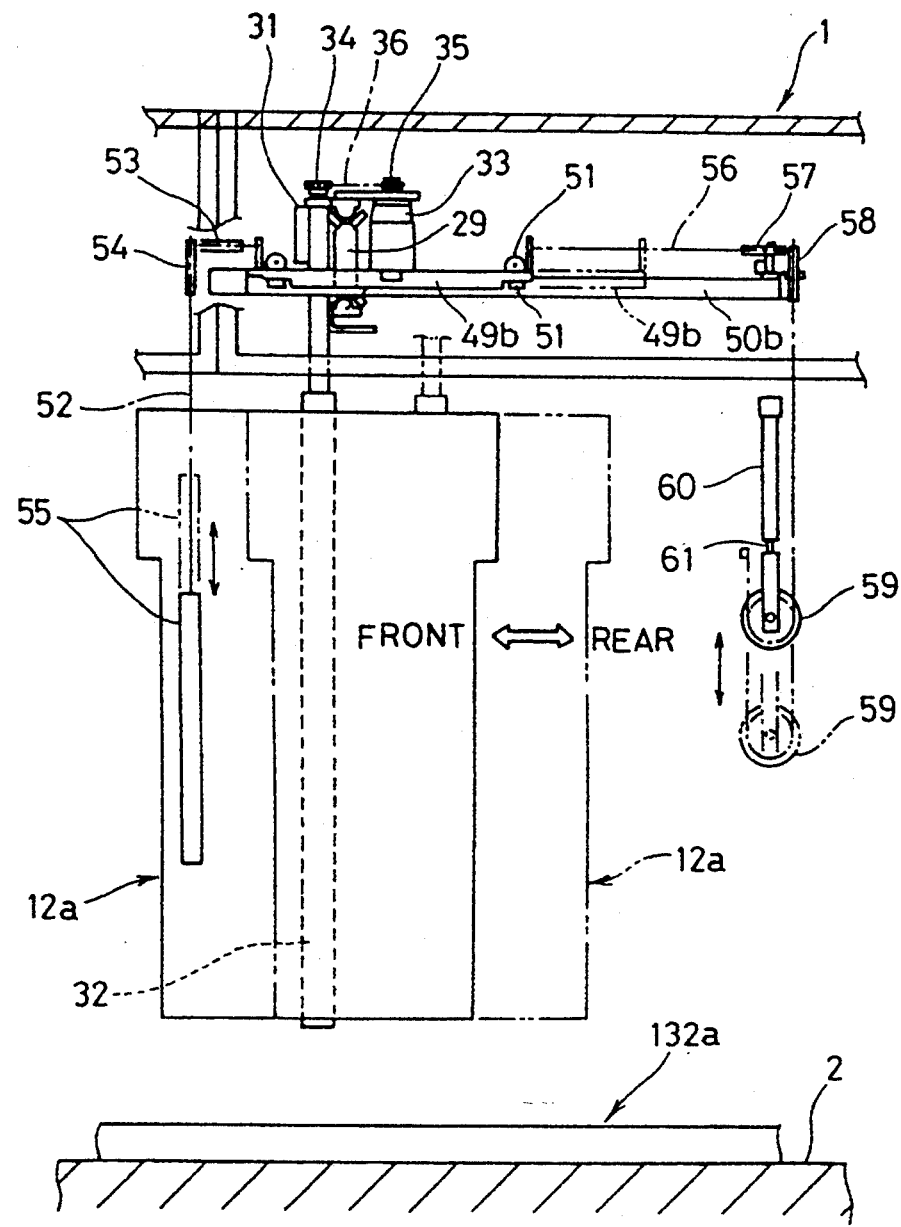
FIG. 8 is a side view of side brushes disposed on one side.

As shown in FIGS. 6 and 8, a wire 52 is connected at one end thereof to the other end of the second movable body 49b and is guided to the other side by a pulley 53 installed on the car washing machine body 1 and also guided downward by a pulley 54. A weight 55 is attached to the other end of the wire 52. The other end portion of the wire 56 is wound on the liftable pulley 59 under tension, the other end of the wire 56 being fixed to the car washing machine body 1. The liftable pulley 59 is adapted to be raised and lowered by an air cylinder 60 attached to the car washing machine body 1.

Figure 11:
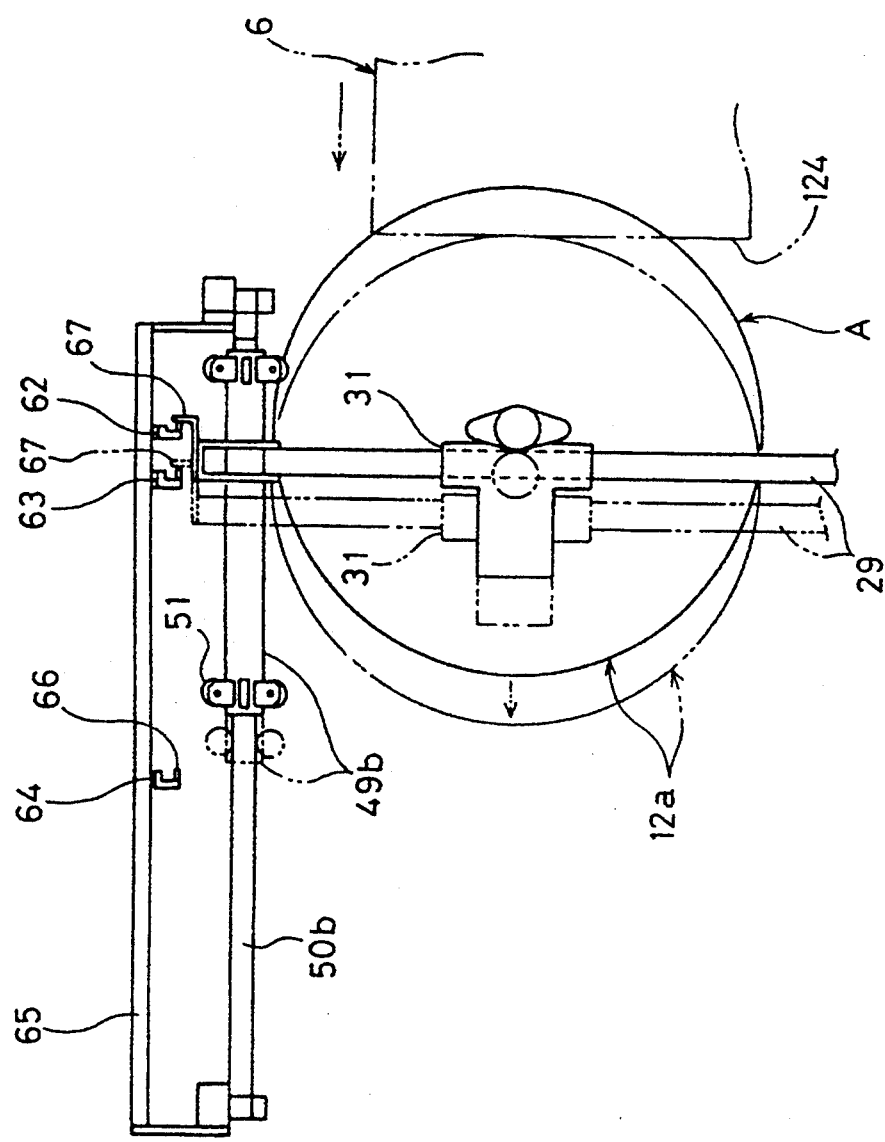
FIG. 11 is a plan view showing the disposition of a vehicle detecting device and an emergency detecting device for side brushes on one side.
Figure 12:
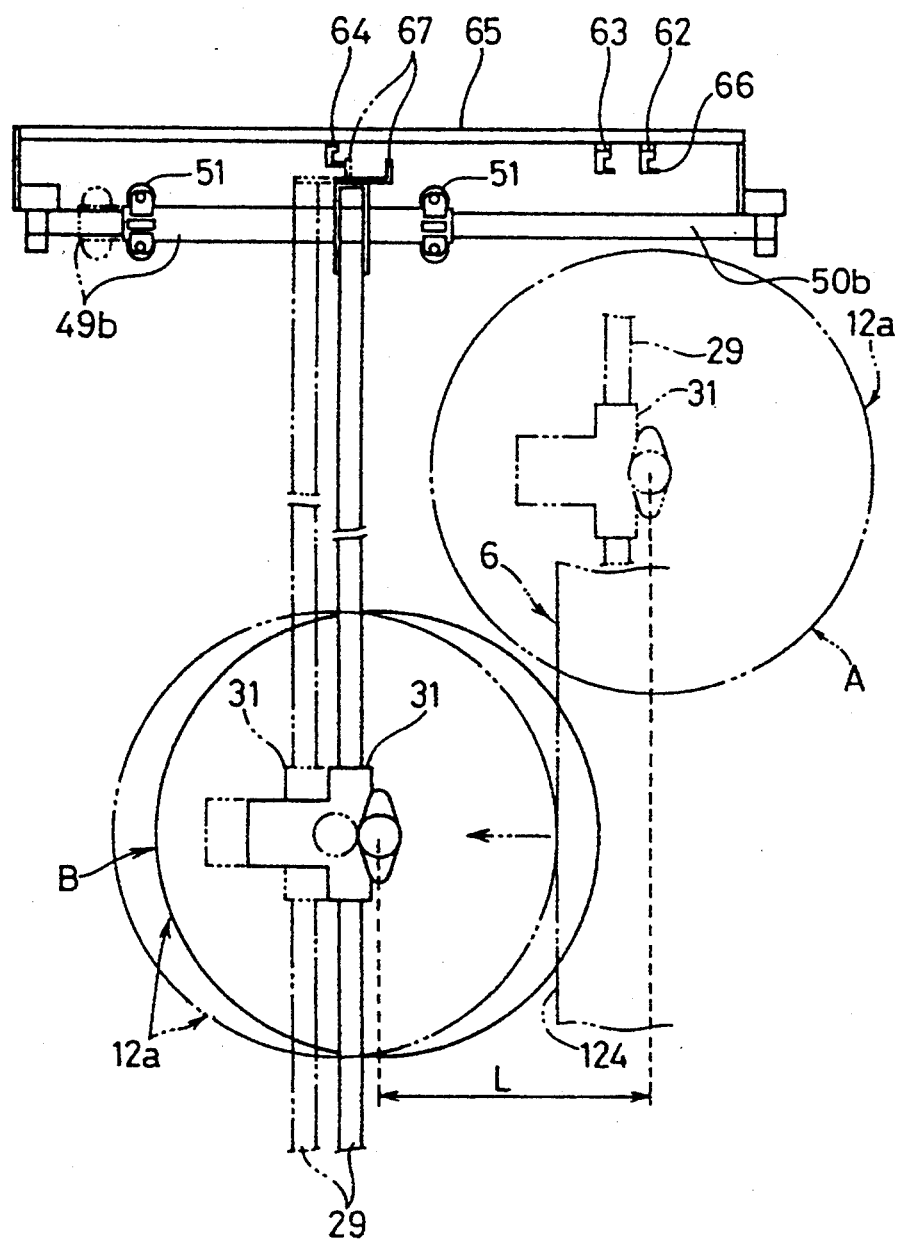
FIG. 12 is a plan view for explaining the operation of the emergency detecting device.

Further, as shown in FIGS. 11 and 12, the other second rail 50b is provided with a standby state detecting limit switch 62, a vehicle detecting limit switch 63, an emergency detecting limit switch 64, which are arranged starting at the front in the order mentioned. These limit switches 62, 63 and 64 are attached to an attaching frame 65 attached to said second rail 50b. The standby state detecting limit switch 62 is located at the front end of said given range L (the range in which one side brush 12a is longitudinally moved), and the emergency detecting limit switch 64 is located rearward beyond said given range L. Further, the vehicle detecting limit switch 63 is located in the given range L and immediately behind the standby state detecting limit switch 63. Attached to the other end surface of the first rail 29 is a detecting element 67 movable into contact with and away from the detecting projections 66 on said limit switches 62, 63 and 64.

As shown in FIGS. 6 and 7, the other side brush 12b is installed on the other lateral side of the second rail 50b. That is, the rotatable shaft 70 of the side brush 12b is rotatably attached to a bracket 71 attached to the frame of the car washing machine body 1 through a bearing. Installed on the bracket 71 is a motor 72 for rotating the other side brush 12b. The motor 72 and the upper end of said rotatable shaft 70 are connected by sprockets 73 and 74 and a chain 75.

Further, as shown in FIGS. 1 and 2, the waxing section 4 is provided with a liftable top brush 78 and a pair of rocker brushes 79a and 79b. The ceiling of the waxing section 4 is provided with a wax substrate spray nozzle 80, a liquid wax spray nozzle 81 and a fluorine coat spray nozzle 82.

The arrangement of the rocker brushes 79a and 79b will now be described.

Figure 18:
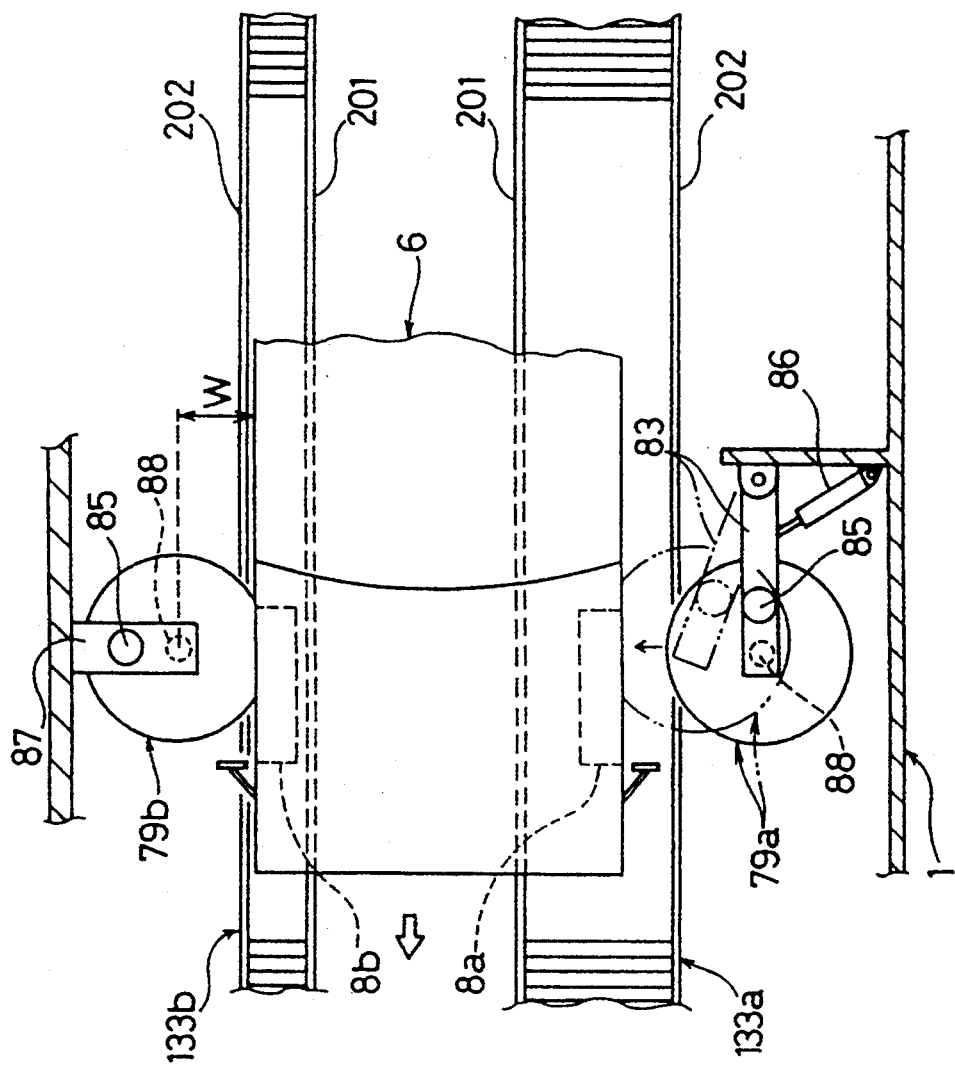
FIG. 18 is plan view of rocker brushes for wax application.

As shown in FIG. 18, the rotatable shaft 88 of one rocker brush 79a is attached for rotation around its longitudinal axis 84 to the front end of a swing arm 83 through a bearing. The swing arm 83 is attached to the car washing machine body 1 so that it is swingable in the transverse direction. The swing arm 83 is provided with a motor 85 for rotating one rocker brush 79a. Further, the car washing machine body 1 is provided with a cylinder 86 for transversely swinging the swing arm 83.

The rotatable shaft 88 of the other rocker brush 79b is attached for rotation around its longitudinal axis 84 to a fixed bracket 87 through a bearing. This fixed bracket 87 is attached to the car washing machine body 1. In addition, the diameter and length of said rocker brushes 79a and 79b are such that they are allowed to abut against the opposite lateral surfaces of the vehicle 6 and the lateral surface of the wheels 8a, 8b, 9a, 9b.

Further, as shown in FIGS. 1 and 2, said drying section 5 is provided with a first top nozzle 90 for predrying the upper surface of the vehicle 6, a second top nozzle 91 for drying the upper surface of the vehicle 6, a pair of side nozzles 92a an 92b for drying the opposite lateral surfaces of the vehicle 6, and a pair of auxiliary side nozzles 93a and 93b for drying the upper regions of the opposite lateral surfaces of a vehicle 6 which has an increased height.

The arrangement of said first and second top nozzles 90 and 91 will now be described.

Figure 19:
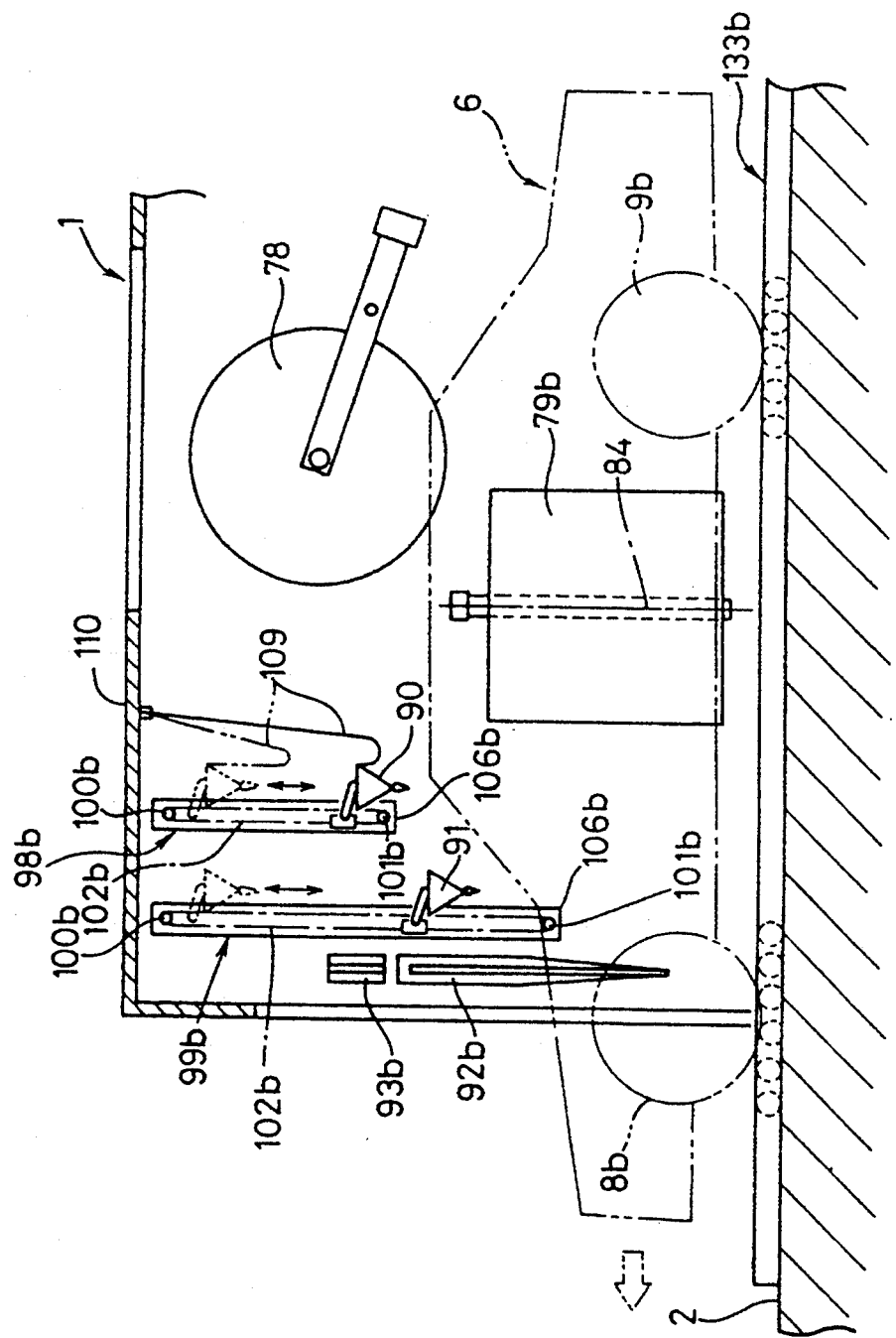
FIG. 19 is a side view showing the arrangement of a drying section.
Figure 20:
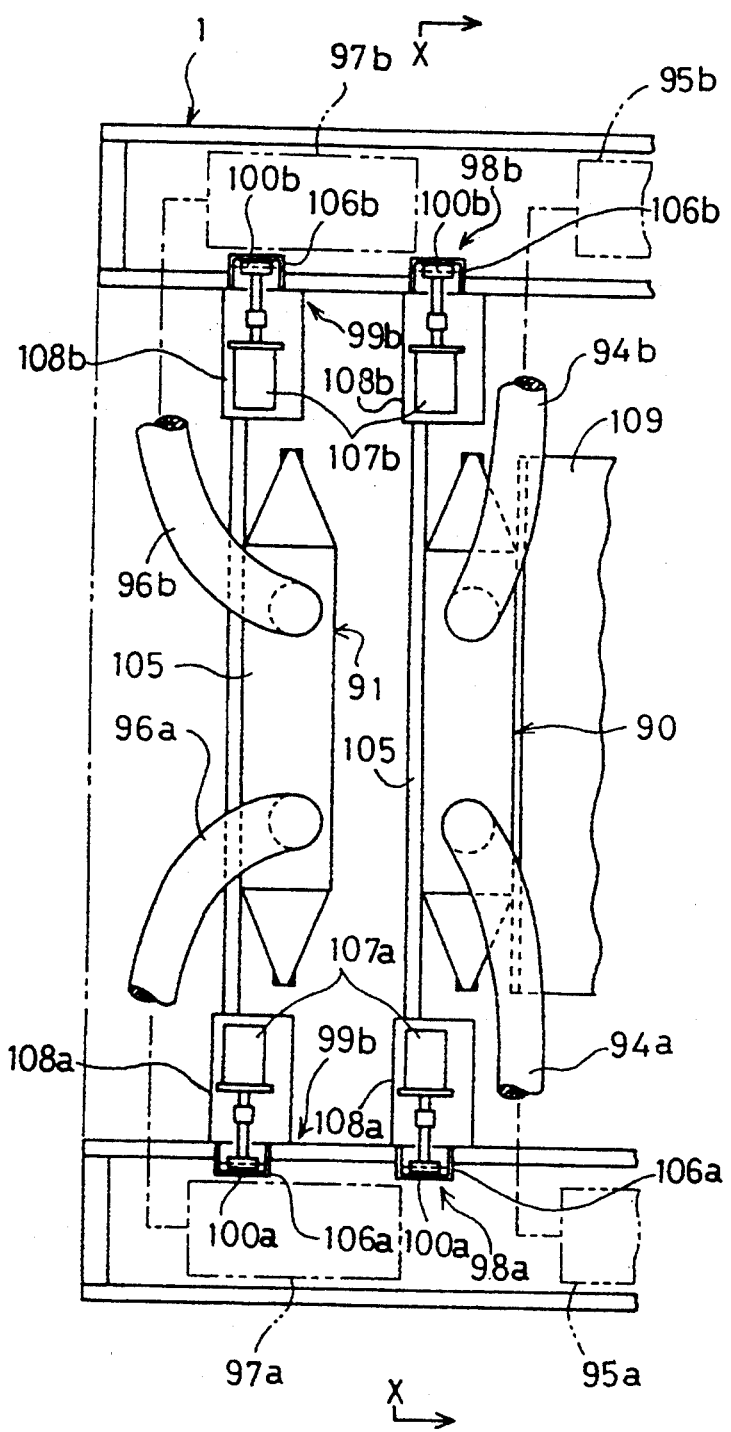
FIG. 20 is a plan view of top nozzles.
Figure 21:
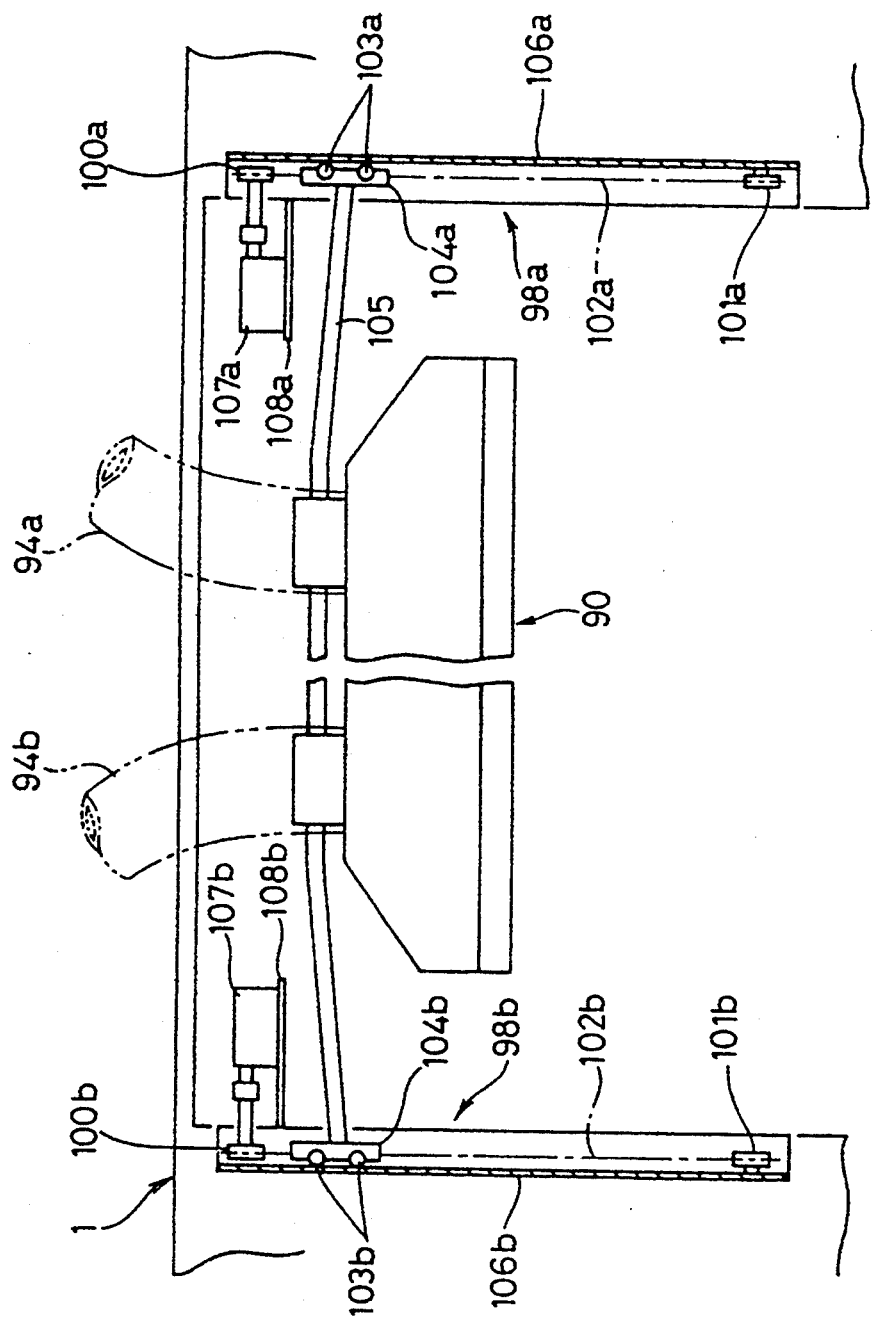
FIG. 21 is a view taken in the direction of arrow X—X in FIG. 20.

As shown in FIGS. 19 through 21, the first top nozzle 90 is disposed rearwardly of the rocker brushes 79a and 79b, while the second top nozzle 91 is disposed rearwardly of the first top nozzle 90, and the two side nozzles 92a and 92b are disposed rearwardly of the second top nozzle 91.

A pair of air feed tubes 94a and 94b are connected at one of their respective ends to the upper surface of the first top nozzle 90 for feeding air into this top nozzle 90. Further, the other ends of said air feed tubes 94a and 94b are connected to a pair of first blower devices 95a and 95b installed in the drying section 5. Likewise, a pair of air feed tubes 96a and 96b are connected at one of their respective ends to the second top nozzle 91 and at the other ends to a pair of second blower devices 97a and 97b.

The drying section 6 is provided with a pair of first lifting devices 98a and 98b for raising and lowering the first top nozzle 90, and a pair of second lifting devices 99a and 99b for raising and lowering the second top nozzle 91.

That is, the first lifting devices 98a and 98b are formed by a pair of upper sprockets 100a and 100b, a pair of lower sprockets 101a and 101b, and chains 102a and 102b extending between and entrained around said sprockets 100a, 101a and 100b, 101b. These chains 102a and 102b have lifting bodies 104a and 104b attached thereto which have guide rollers 103a and 103b, and the first top nozzle 90 is attached to the front side of a support pipe 105 installed between the lifting bodies 104a and 104b. Further, the car washing machine body 1 is provided with guide rails and 106a and 106b extending vertically along the chains 102a and 102b, so that the lifting bodies 104a and 104b are raised and lowered as they are guided by the guide rails 106a and 106b. The guide rails 106a and 106b are in the form of channel members of U-shaped cross section disposed with their openings opposed to each other.

Motors 107a and 107b are installed above and on opposite sides of the first top nozzle 90. These motors 107a and 107b are attached to attaching stands 108a and 108b mounted on the upper end of the guide rails 106a and 106b. The output shafts of these motors 107a and 107b are connected to the upper sprockets 100a and 100b opposed thereto.

Further, the second lifting devices 99a and 99b have the same construction as that of the first lifting devices 98a and 98b described above, and a description thereof is omitted. In addition, the lower limit position of the first top nozzle 90 is somewhat above the roof of the vehicle 6 to be washed and hence higher than that of the second top nozzle 91.

As shown in FIGS. 19 and 20, a vinyl sheet 109 is installed between the top brush 78 and the first top nozzle 90. That is, this vinyl sheet 109 is dependent from the frame 110 of the ceiling of the car washing machine body 1, with the lower end of said vinyl sheet 109 being connected to the front end of the first top nozzle 90. The width of the vinyl sheet 109 is substantially equal to the width of the first top nozzle 90. Further, the length of the vinyl sheet 109 is such that when the first top nozzle 90 is in its lower limit position, no slack is produced in the vinyl sheet 109.

The arrangement of said side nozzles 92a, 92b and auxiliary side nozzles 93a, 93b will now be described.

Figure 22:
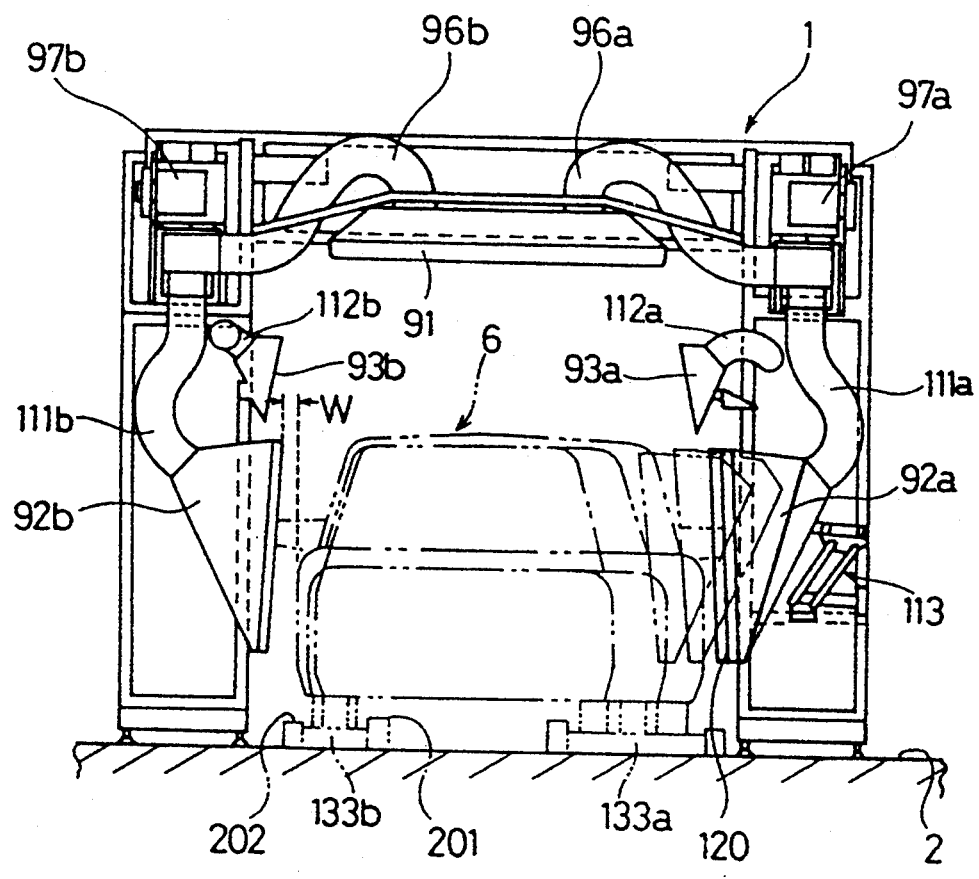
FIG. 22 is a rear view of the car washing machine body.

As shown in FIG. 19, the side nozzles 92a, 92b and auxiliary side nozzles 93a, 93b are disposed rearwardly of the second top nozzle 91. And, as shown in FIG. 22, pairs of air feed tubes 111a, 111b and 112a, 112b are connected at one of their respective ends to the upper surfaces of the side nozzles 92a, 92b and auxiliary side nozzles 93a, 93b. And the other ends of the air feed tubes 111a, 111b are connected to the first blower devices 95a, 95b, while the other ends of the air feed tubes 112a, 112b are connected to the second blower devices 97a, 97b. Further, one side nozzle 92a has an actuator 113 attached thereto which allows the side nozzle 92a to advance and retract as shown in phantom lines in FIG. 22, and the other side nozzle 92b is fixed to the car washing machine body 1.

Figure 23:
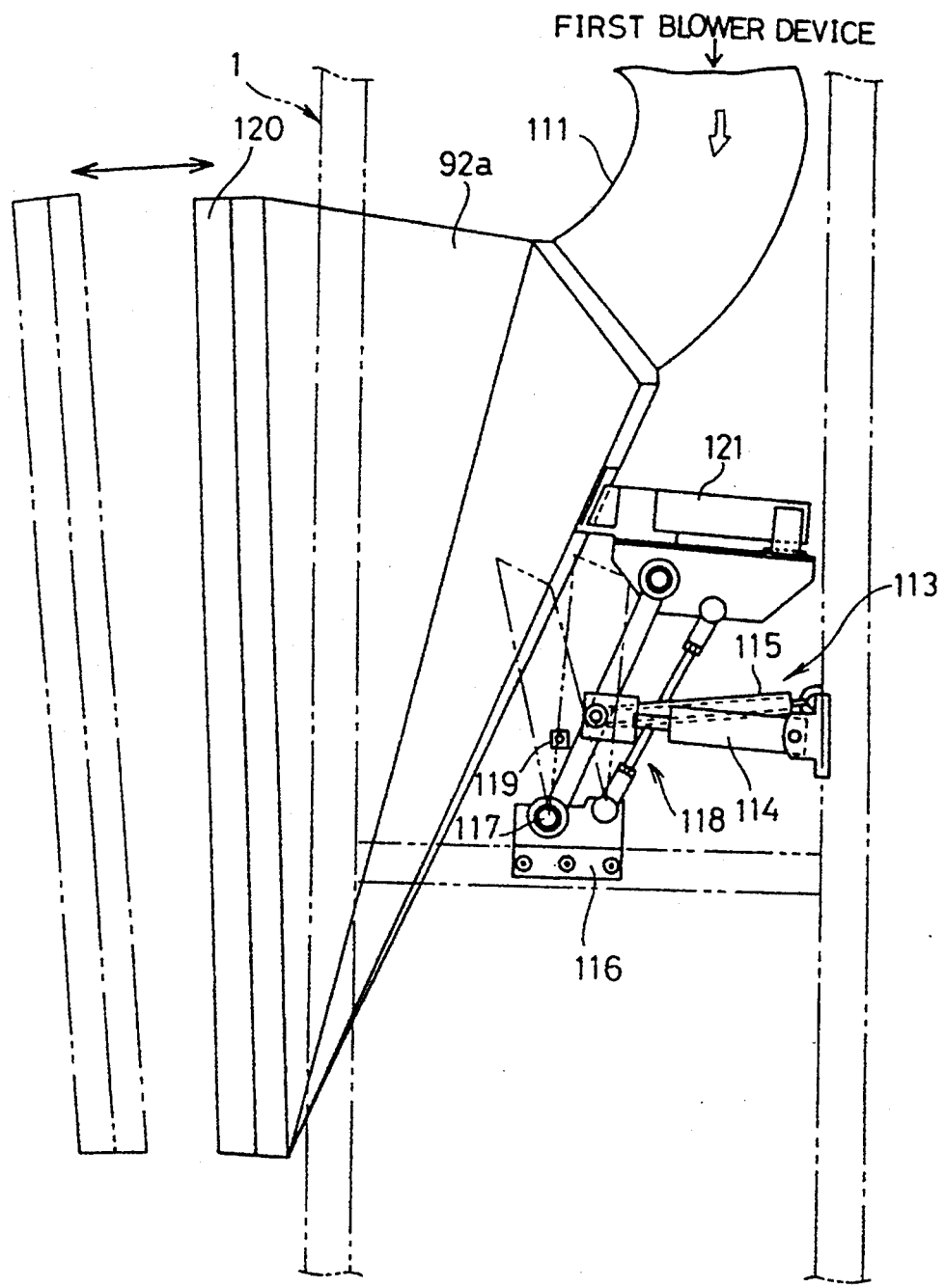
FIG. 23 is a rear view of side nozzles on one side.

The actuator 13, as shown in FIG. 23, comprises an air cylinder connected at one end thereof to an air cylinder 114 connected to the car washing machine body 1, a spring 115 connected at one end thereof to the car washing machine body 1 and at the other end thereof to the front end of the rod of the air cylinder 114, a parallel link mechanism 118 adapted to be swung by the air cylinder 114 against the force of the spring 115 around a pivot 117 on a support member 116 fixed to the car washing machine body 1, and a member 121 fixed to the parallel link mechanism 118 and supporting one side nozzle 92a. The advance and retraction position and inclination angle of said side nozzle 92a are attained by adjusting the length of the parallel links of the parallel link mechanism 118. Further, to detect the position where the side nozzle 92a is drawn toward the car washing machine body 1 (retraction limit position), there is an advance and retraction position detecting sensor 119 in the form of a reflection type photoelectric switch. Further, attached over the front end of the side nozzle 92a is a sensor sheet 120 having protective rubber enclosing a sensor. This sensor sheet 120 is actuated upon contact with the vehicle to be washed 6.

The arrangement of the roller conveyors 7a and 7b will now be described.

As shown in FIGS. 1 and 2, one roller conveyor 7a is a conveyor for supporting and transporting the front and rear wheels 8a and 8b on one side of the vehicle 6, while the other roller conveyor 7b is a conveyor for supporting and transporting the front and rear wheels 8a and 8b on one side of the vehicle 6. In addition, the width W1 of the transport surface of one roller conveyor 7a is large enough to accommodate a variety of vehicle widths, while the transport width W2 of the transport surface of the other roller conveyor W2 is small.

These conveyors 7a and 7b are divided into three parts, a pair of front conveyors 131a and 131b for transporting the vehicle 6 into the car washing machine body 1, a pair of intermediate conveyors 132a and 132b extending over the washing section 5, and a pair of rear conveyors 133a and 133b for transporting the vehicle 6 out of the car washing machine body 1. Further, front slopes 134a and 134b to ensure smooth loading of the vehicle are installed at the initial ends of the front conveyors 131a and 131b, and rear slopes 135a and 135b to ensure smooth unloading of the vehicle are installed at the terminal sides of the front conveyors 131a and 131b.

The arrangement of the conveyors 131a through 133a, and 131b through 133b will now be described by taking the conveyor 131b as an example.

Figure 24:
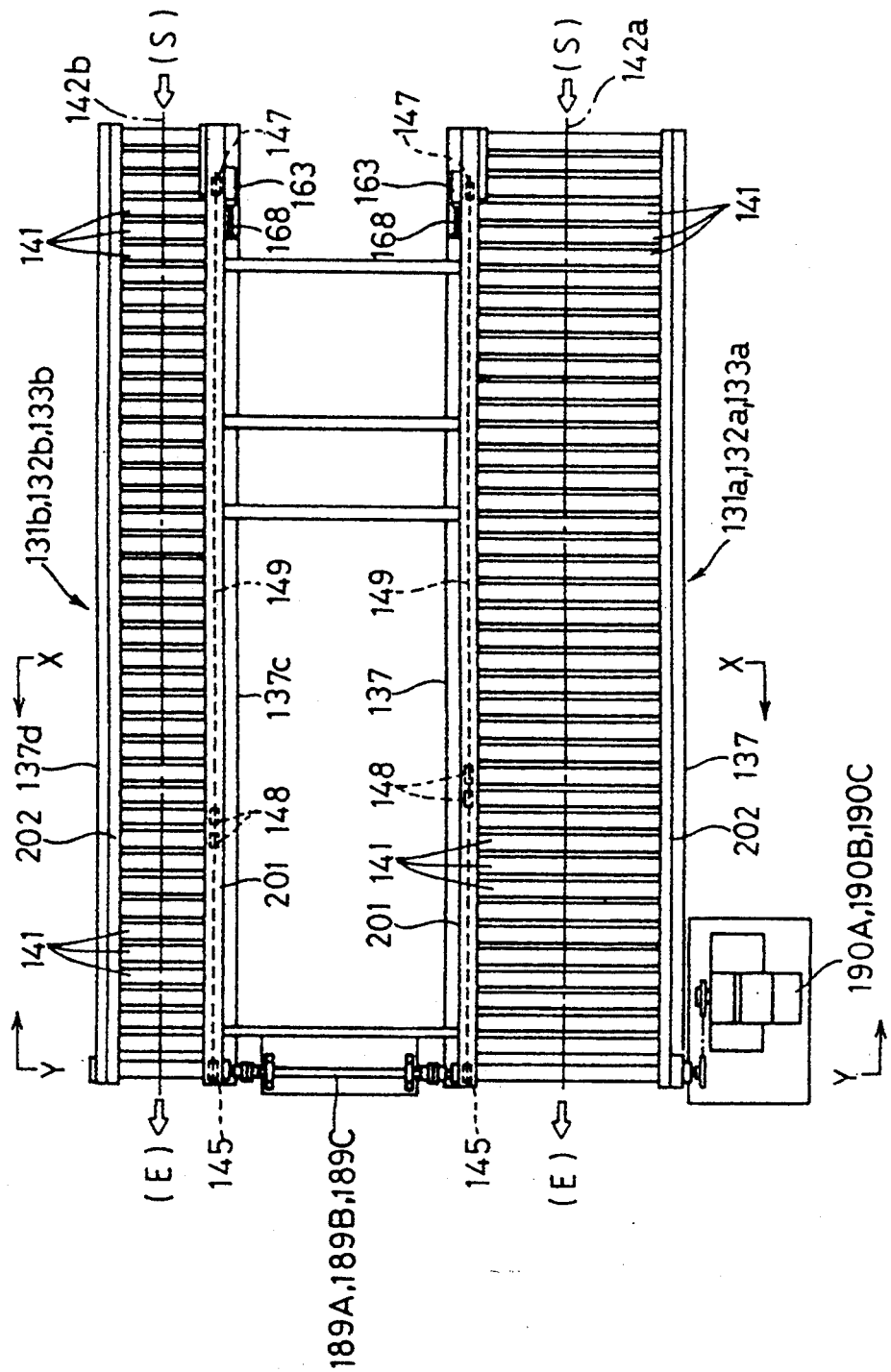
FIG. 24 is a plan view of each divided conveyor.
Figure 25:
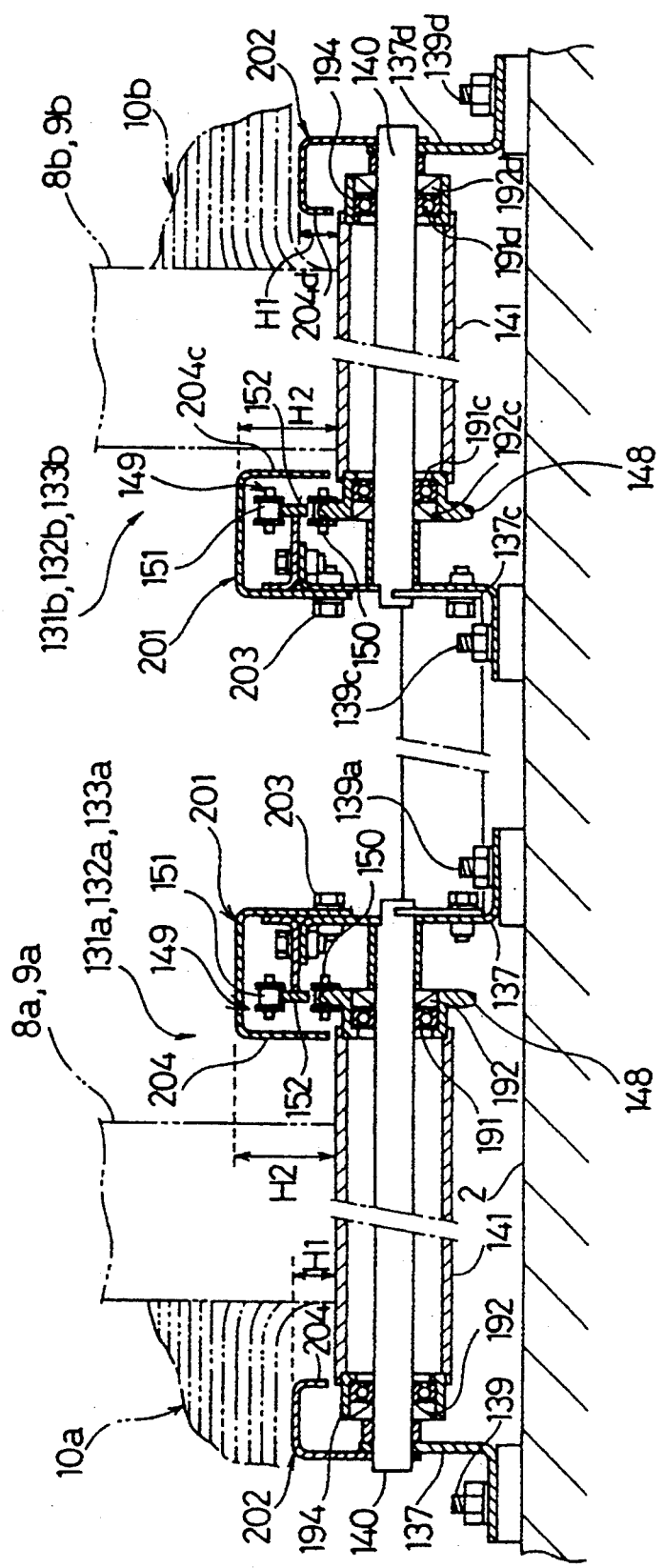
FIG. 25 is a view taken in the direction of arrow X—X in FIG. 24.

As shown in FIGS. 24 and 25, the conveyor 131b has a pair of conveyor frames 137c and 137d installed on the floor 2. These conveyor frames 137c and 137d are mounted on the floor 2 and fixed in position by fixing bolt and nut devices 139c and 139d. A plurality of rollers 141 supported for free rotation by support shafts 140 are disposed between the conveyor frames 137 and 138.

Figure 26:
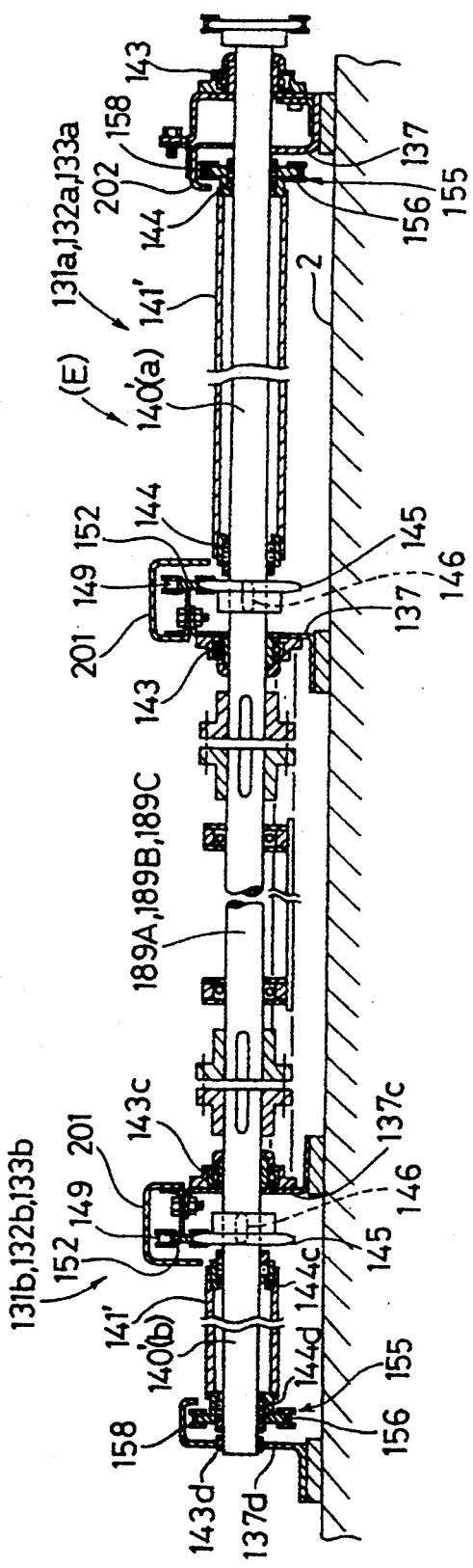
FIG. 26 is a view taken in the direction of arrow Y—Y in FIG. 24.
Figure 27:
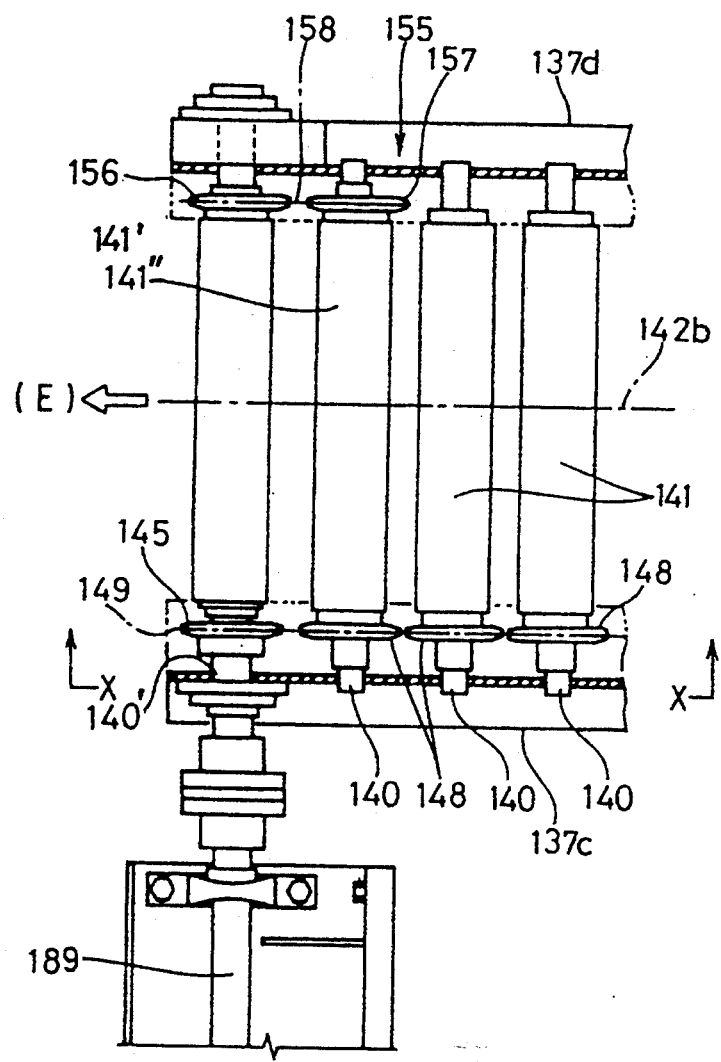
FIG. 27 is a plan view of the terminal end of the conveyor.
Figure 28:
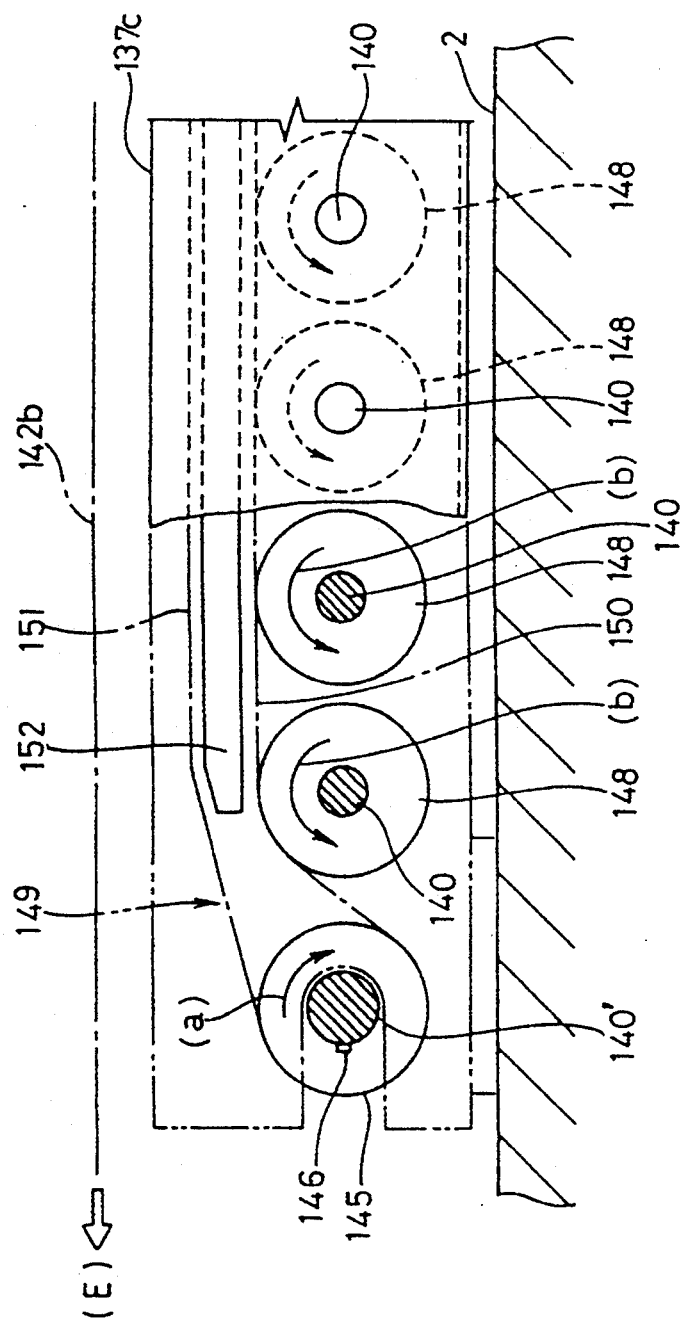
FIG. 28 is a view taken in the direction of arrow X—X in FIG. 27.

Further, as shown in FIGS. 26, 27 and 28, the support shaft 140' positioned at the terminal end (E) of the transport path 142b is attached for rotation to the conveyor frames 137a and 137d through bearings 143c and 143d. Further, bearings 144c and 144d are disposed between the support shaft 140' and the roller 141', so that the latter two members are rotatable. And a fixed sprocket 145 is mounted on one end of each support shaft 140' and connected to the latter by a key 146.

Further, as shown in FIG. 24, the initial end (S) of the transport path 142b is provided with a sprocket 147 movable in the direction of the transport path and,-as shown in FIG. 25, an intermediate roller 141 is provided at one end thereof with an intermediate sprocket 148. A chain 149 extends between and is entrained around the fixed and movable sprockets 145 and 147 and, as shown in FIG. 28, the lower run 150 of the chain 149 meshes with the upper region of said intermediate sprocket 148. Disposed between the lower and upper runs 150 and 151 is a guide rail 152 for guiding the chain 149 over these runs 150 and 151, said guide rail extending along the inner surface of the conveyor frame 137c.

As shown in FIGS. 26 and 27, disposed between the roller 141' at the terminal end (E) of said transport path 142b and the roller 141" disposed forwardly adjacent said roller 141' is a first transmission device 155 for rotating these two rollers 141' and 141" in the same direction. The first transmission device 155 comprises an end roller rotating sprocket 156 mounted on the other end of the roller 141' at the terminal end (E), a torque supplying sprocket 157 mounted on the other end of the roller 141' disposed forwardly adjacent the roller 141' at the terminal end (E), and an auxiliary chain 158 extending between and entrained around said end roller rotating sprocket 156 and said torque supplying sprocket 157.

Figure 29:
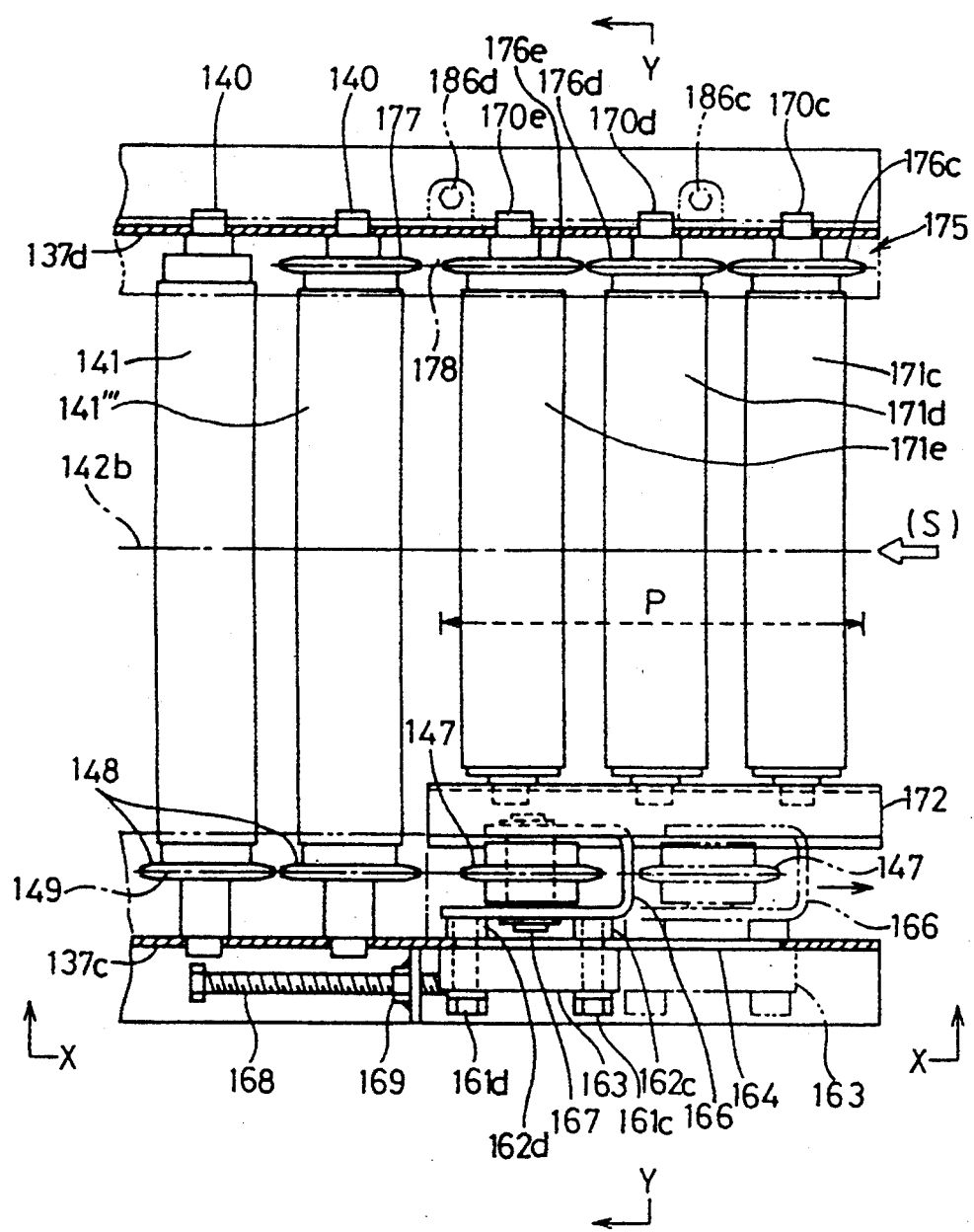
FIG. 29 is a plan view of the initial end of the conveyor.
Figure 30:
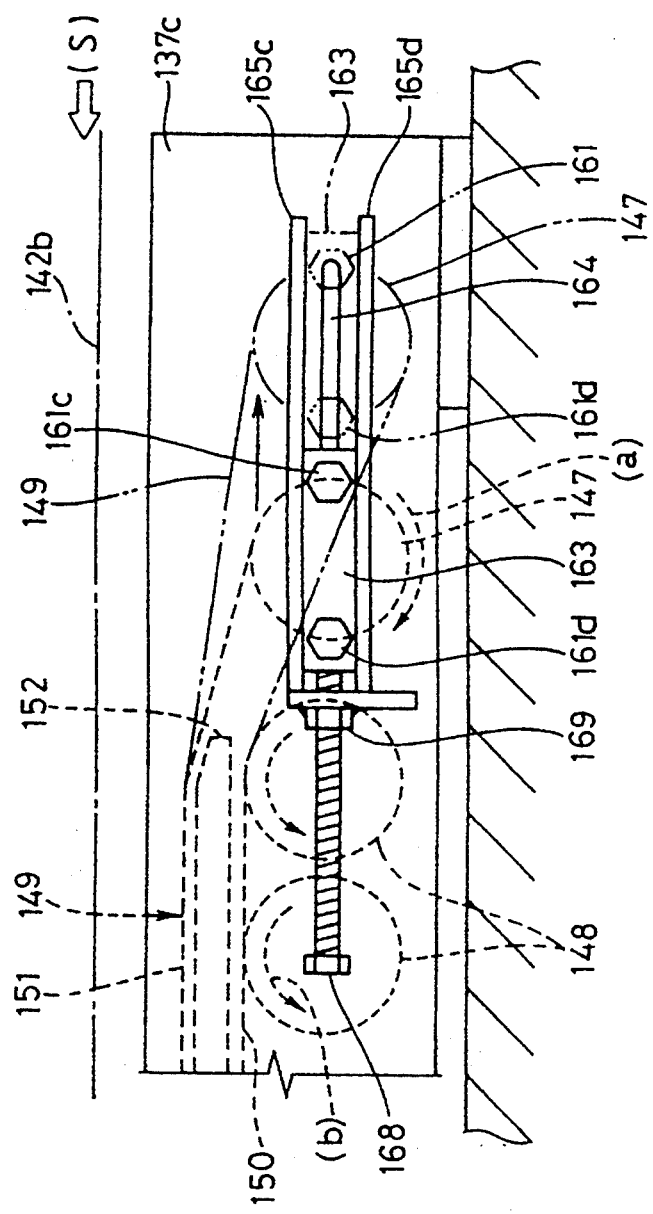
FIG. 30 is a view taken in the direction of arrow X—X in FIG. 29.
Figure 31:
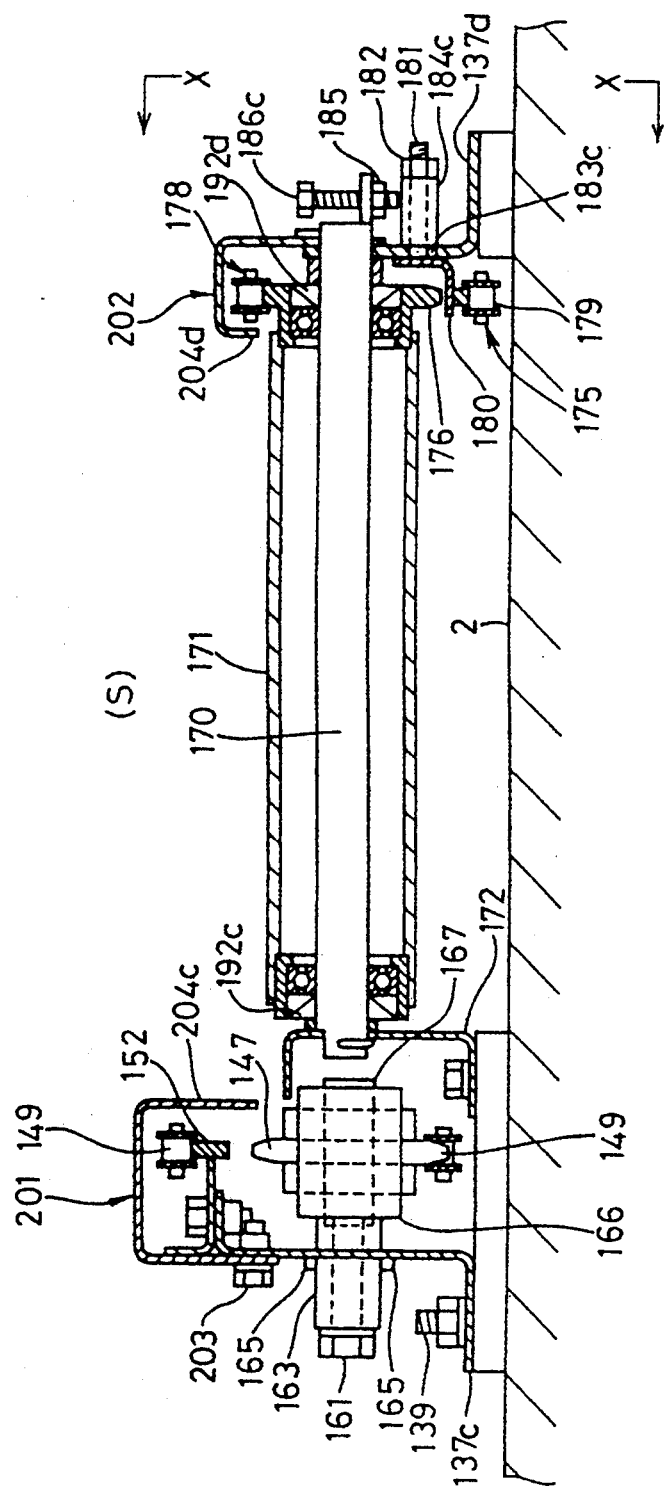
FIG. 31 is a view taken in the direction of arrow Y—Y in FIG. 29.

Further, as shown in FIGS. 29, 30 and 31, a movable block body 163 is connected to the outer surface of the conveyor frame 137c on one side at the initial end (S) of the transport path 142b by bolts 161c, 161d and nuts 162c, 162d which are used to fix said movable sprocket 147. And the conveyor frame 137c is formed with a single bolt hole 164 which is elongated in the direction of the transport path 142b for receiving the fixing bolts 161c and 161d. Further, a pair of guide members 165c and 165d for guiding the movable block body 163 in the direction of the transport path 142b are installed on the outer surface of the conveyor frame 137c.

A bracket 166 which is U-shaped as seen in plan view is integrally installed between the pair of nuts 162c and 162d, and said movable sprocket 147 is freely rotatably attached to said bracket 166 through a support shaft 167. The outer surface of the conveyor frame 137c on one side is provided with a pusher bolt 168 for pushing the movable sprocket 147 toward the initial end (S). That is, the pusher bolt 168 is screwed into a nut 169 disposed on the conveyor frame 137c, with the front end of the pusher bolt 168 abutting against the movable block body 163; thus, tightening the pusher bolt 168 urges the movable block body 163 toward the initial end (S) to move the movable sprocket 147.

Within the range of movement of said movable sprocket 147, there are three accessory rollers 171c, 171d and 171e supported for free rotation on support shafts 170c, 170d and 170e. These support shafts 170c, 170d and 170e are fitted at one of their respective ends into an accessory frame 172 disposed inwardly of said conveyor frame 137c on one side and at the other ends thereof into the conveyor frame 137d on the other side.

Figure 32:
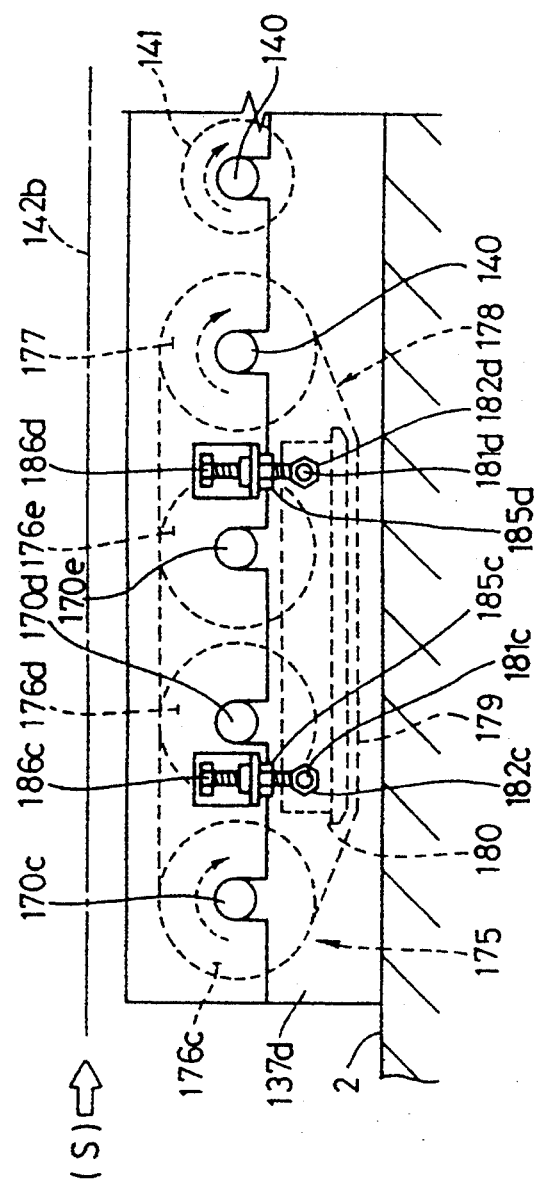
FIG. 32 is a view taken in the direction of arrow X—X in FIG. 31.

As shown in FIGS. 29, 31 and 32, a second transmission device 175 is installed between these accessory 171c, 171d, 171e and a roller 141''' for rotating the accessory rollers 171c, 171d and 171e in the same direction as the roller 141'''.

The second transmission device 175 comprises rotating sprockets 176c, 176d and 176e mounted on the other ends of the accessory rollers 171c, 171d and 171e, a torque supplying sprocket 177 mounted on the other end of the roller 141''' disposed adjacent thereto, and an auxiliary chain 178 extending between and entrained around said rotating sprocket 156 and said torque supplying sprocket 157.

A chain guide 180 is installed above the lower run 179 of the auxiliary chain 178 for depressing the lower run 179. The chain guide 180 is provided with a pair of attaching bolts 181c and 181d extending through the conveyor frame 137d on the other side. And fixing nuts 182c and 182d are threadedly engaged on these attaching bolts 182c and 182d, whereby the chain guide 180 is fixed on the inner surface of the conveyor frame 137d on the other side. In addition, as shown in FIG. 31, the conveyor frame 137d on the other side is formed with a hole which is vertically elongated to receive said attaching bolts 181d and 181d. Further, the attaching bolts 181c and 181d have spacers 184c and 184d fitted thereon between the fixing nuts 182c, 182d and the conveyor frame 137d. These spacers 184c and 184d are depressed by a pair of keep bolts 186c and 186d screwed into nuts 185c and 185d.

Further, as shown in FIG. 25, oil seals 192c and 192d for preventing entry of foreign matter, such as water or dirt, are fitted in the outer sides of bearings 191c and 191d disposed between each support shaft 140 except those disposed at the terminal and initial ends (E) and (S) of the transport path 142b and the roller 141.

Figure 33:
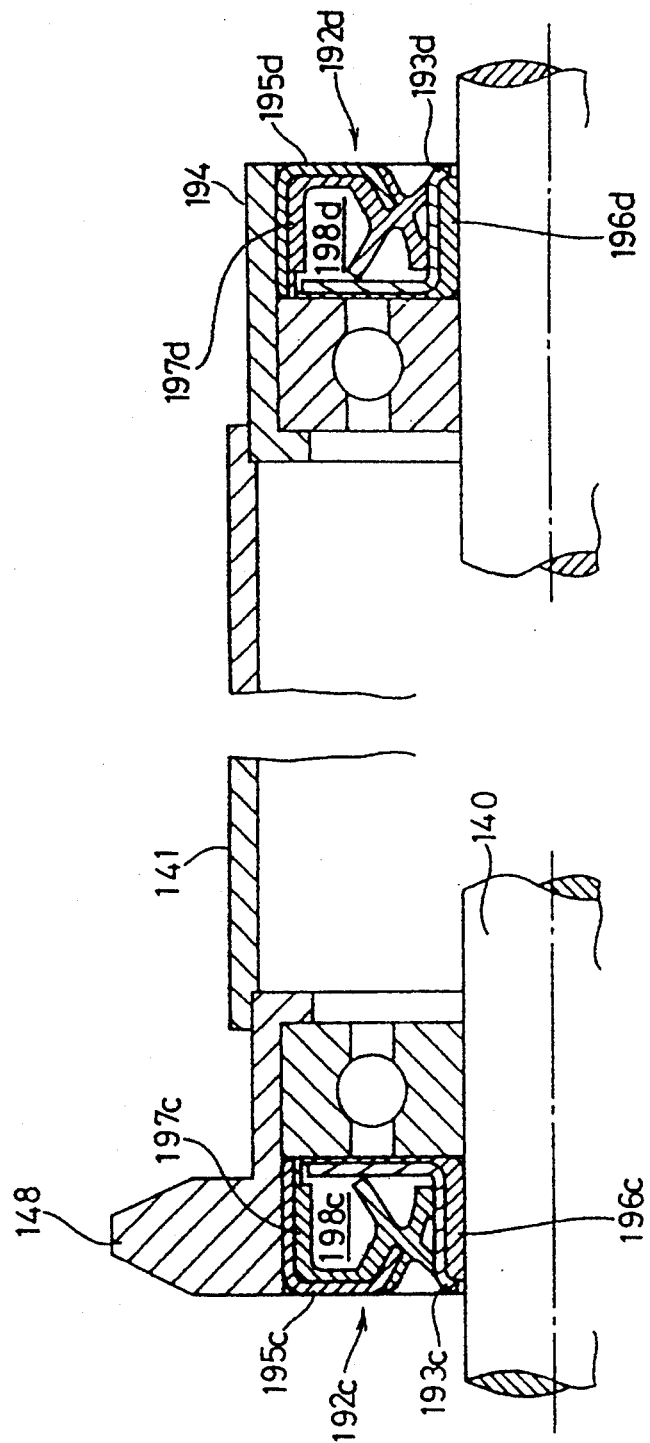
FIG. 33 is a view for explaining a seal construction between a support shaft and a roller.

The oil seals 192c and 192d, as shown in FIG. 33, comprise inner rings 193c and 193d of metal fitted of the outer surface of the support shaft 140, outer rings 195c and 195d of metal fitted on the inner surface of the sprocket 148 or the inner surface of the end cap 194 (see FIG. 25) of the roller 141, annular packings 196c and 196d of rubber disposed between said inner rings 193c, 193d and the outer surface of the support shaft 140, and annular packings 197c and 197d of rubber fitted adjacent said outer rings 195c and 195d and in slide contact with the inner rings 193c and 193d. And grease is filled in hollow spaces 198c and 198d defined between the outer packings 197c, 197d and the inner rings 193c, 193d. In addition, as shown in FIG. 31, similar oil seals 192c and 192d are fitted in bearings disposed between the accessory rollers 171c, 171d, 171e at the initial end (S) of the transport path 142b and the support shafts 170c, 170d, 170e.

As shown in FIG. 31, wheel guide bodies 201 and 202 installed above the conveyor frames 137c and 137d to extend over the entire length thereof. Of these wheel guide bodiest the one 201 disposed in the middle of the car washing machine body 1 is tunnel-shaped with its lower side opened, and is removably attached to the upper end of the conveyor frame 137c on one side by bolts and nuts 203. This wheel guide body 201 receives said chain 149 to prevent water from being sprayed over or foreign substances entering the chain 149. Furthers the wheel guide body 202 positioned adjacent the car washing machine body 1 is tunnel-shaped with its lower side opened and is welded to the upper region of the conveyor frame 137d disposed on the other side. The opposed walls of these wheel guide bodies 201 and 202 are formed with guide surfaces 204c and 204d for guiding the wheels 8b and 9b of the vehicle 6. And, as shown in FIG. 25, the attaching level H1 measured from the transport surface of the wheel guide body 202 is set lower than the attaching level H2 of the wheel guide body 201 over the entire length.

Further, the arrangement of the conveyors 132b and 133b is the same as that of the conveyor 131b and a description thereof is omitted.

The arrangement of the conveyors 131a through 133a is in mirror image relation to that of the conveyor 131b described above. A description of the arrangement of the conveyors 131a through 33a is omitted. Further, as shown in FIGS. 24 and 26, pairs of support shafts 140'b and 140'a positioned at the terminal ends (E) of the respective transport paths 142 for the pairs of conveyors 131a–133a and 131b–133b are connected by connecting shafts 189A, 189B and 189C, respectively. In addition, either the support shafts 140'b or 140'a have motors 190A, 190B and 190C connected thereto. The front conveyors 131a, 131b, the intermediate conveyors 132a, 132b, and the rear conveyors 133a, 133b are individually driven by these motors 190A, 190B, 190C.

The driving of the front conveyors 131a, 131b, the intermediate conveyors 132a, 132b, and the rear conveyors 133a, 133b will now be described in more detail.

When the motors 190A, 190B and 190C are driven, the support shafts 140' positioned at the terminal ends (E) of the transport paths 142 are rotated in one direction and the fixed sprockets 145 are rotated in one direction (a). Thereby, as shown in FIG. 30, when the chain 149 is rotated, the movable sprocket 148 at the initial end (S) is rotated in one direction while the intermediate sprockets 148 are rotated in the other direction (b), and together with these intermediate sprockets 148, the intermediate rollers 141 are rotated in the other direction (b).

In this case, as shown in FIG. 26, since the roller 141' at the terminal end (E) of the transport path 142 is isolated from the support shaft 140' through the bearing 144, the roller 141' at the terminal end (E) is not rotated with the support shaft 140' and instead it is rotated by the first transmission device 155 in the other direction which is the same as the direction of rotation of the intermediate rollers 141. That is, as shown in FIG. 27, the rotation of the intermediate rollers 141 in the other direction causes the torque supplying sprocket 157 to rotate in the other direction to rotate the auxiliary chain 158, thus rotating the end roller rotating sprocket 156 in the other direction. Thereby, as described above, the rollers 141' at the terminal ends (E) of the transport paths 142 are also rotated in the other direction.

Likewise, as shown in FIG. 29, at the initial end (S) of the transport path 142, the accessory rollers 171c, 171d and 171e are rotated by the second transmission device 175 in the other direction which is the same as the direction of rotation of the intermediate rollers 141. That is, the rotation of the adjacent intermediate roller 141''' in the other direction causes the torque supplying sprocket 177 to rotate in the other direction to rotate the auxiliary chain 178, thus rotating the rotating sprockets 176c, 176d and 176e in the other direction. Thereby, the accessory rollers 171c, 171d and 171e are also rotated in the other direction. In this manner, since the rollers 141 and auxiliary rollers 171c, 171d and 171e are rotated in the other direction, the vehicle 6 to be washed is gradually transported from the initial ends (S) to the terminal ends (E) along the transport paths 142 of the conveyors 131a–133a and 131b–133b.

Further, as shown in FIG. 28, since the lower run 150 of the chain 149 is in mesh with the upper portions of the intermediate sprockets 148, the lower run 150 is positioned at a high level above the floor 2, so that foreign substances, such as sand and water collected on the floor 2, are prevented from adhering to the lower run 150, and it is possible to decrease the height of each of the conveyors 131a–133a and 131b–133b.

Further, as shown in FIG. 29, in the case where the chain 149 is elongated to produce a slack, this can be coped with by loosening the fixing bolts 161 and then tightening the pusher bolt 168. Thereby, as shown in phantom lines in FIGS. 29 and 30, the movable block body 163 is pushed to the initial end (S) by the pusher bolt 168, so that the movable sprockets 147 are also moved to the initial end (S), increasing the distance between the movable sprockets 147 and the fixed sprocket 145 located at the terminal end (E) of the transport path 142. Thereby, the elongation of the chain 149 is accommodated to tension the chain 149. Thereafter, said fixing bolts 161 are tightened, whereby the movable sprocket 147 together with the movable block 163 is fixed to the conveyor frame 137c.

In this manner, the slacking of the chain 149 can be prevented by moving the movable sprocket 147 in the direction of the transport path. Further, the provision of the accessory rollers 171c, 171d and 171e within the range of movement of the movable sprocket 147 eliminates the possibility that a dead space corresponding to the range of movement is produced in the ends of the conveyors 131a–133a and 131b–133b. Therefore, as shown in FIG. 2, the transport is smoothly effected over the joints between the front conveyors 131a, 131b and the intermediate conveyors 132a, 132b and between the intermediate conveyors 132a, 132b and the rear conveyors 133a, 132b disposed in series.

Further, as shown in FIGS. 31 and 32, in the case where the auxiliary chain 178 of the second transmission device 175 is elongated to produce a slack, this can be coped with by loosening the fixing nuts 182 and then tightening the keep bolts 186. Thereby, the chain guide 180 is pushed by the keep bolts 186 to move downward; thus, the lower run 179 of the auxiliary chain 178 is depressed. Therefore, the elongation of the auxiliary chain 178 is accommodated to tension the auxiliary chain 178. Thereafter, the fixing nuts 182 are tightened, whereby the chain guide 180 is fixed to the conveyor frame 137d.

Further, as shown in FIG. 1, the floor 2 has a pair of stopping devices 206a and 206b which cause the vehicle getting on the pair of front conveyors 131a and 131b from the initial end to stand by at a predetermined position, and the front conveyor 131a is provided with a vehicle mount limit switch 123 for detecting the fact that the vehicle 6 has come to said predetermined standby position.

Since the stopping device 206a is the same as the stopping device 206b, only the latter will now be described.

Figure 34:
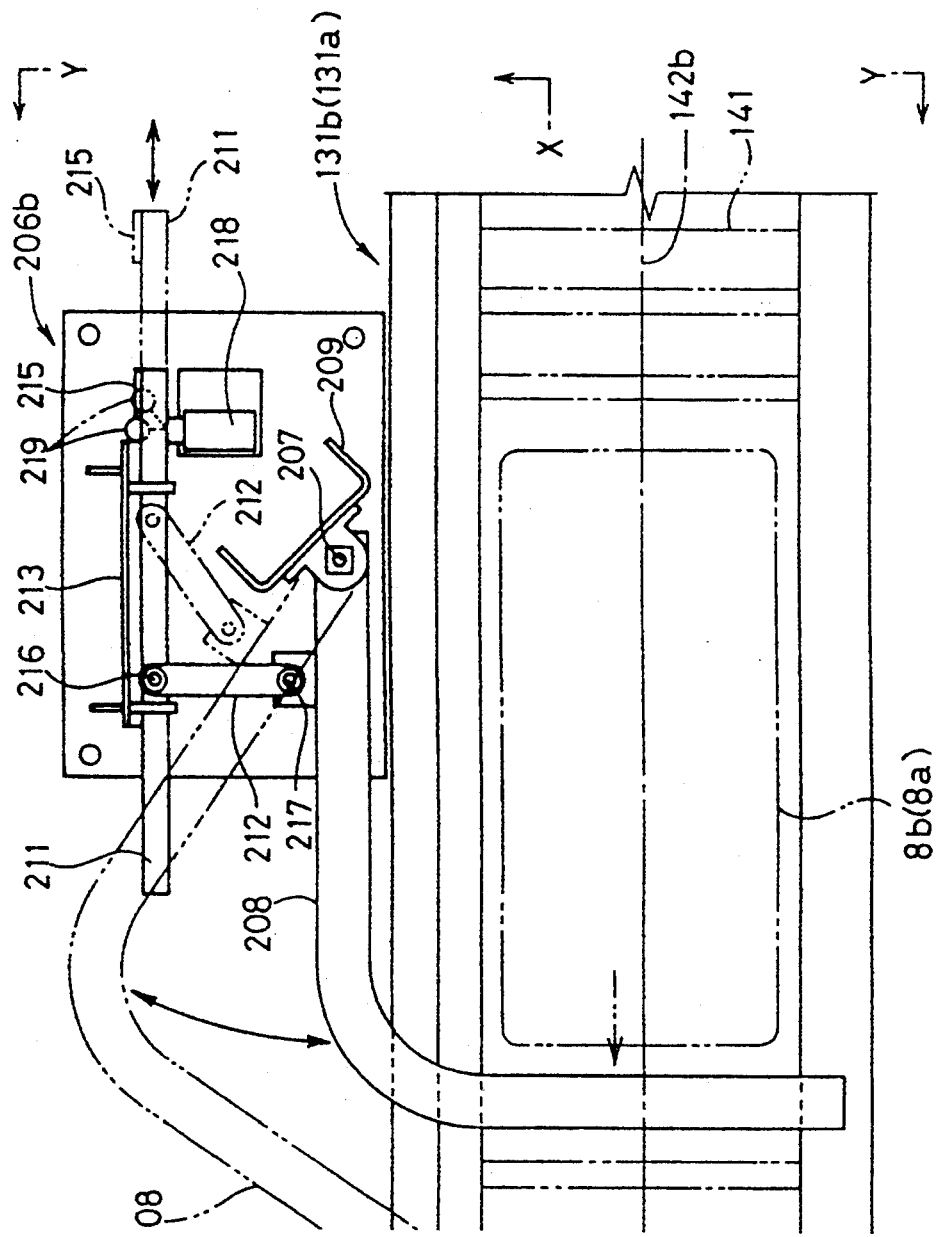
FIG. 34 is a plan view of a stopping device.
Figure 35:
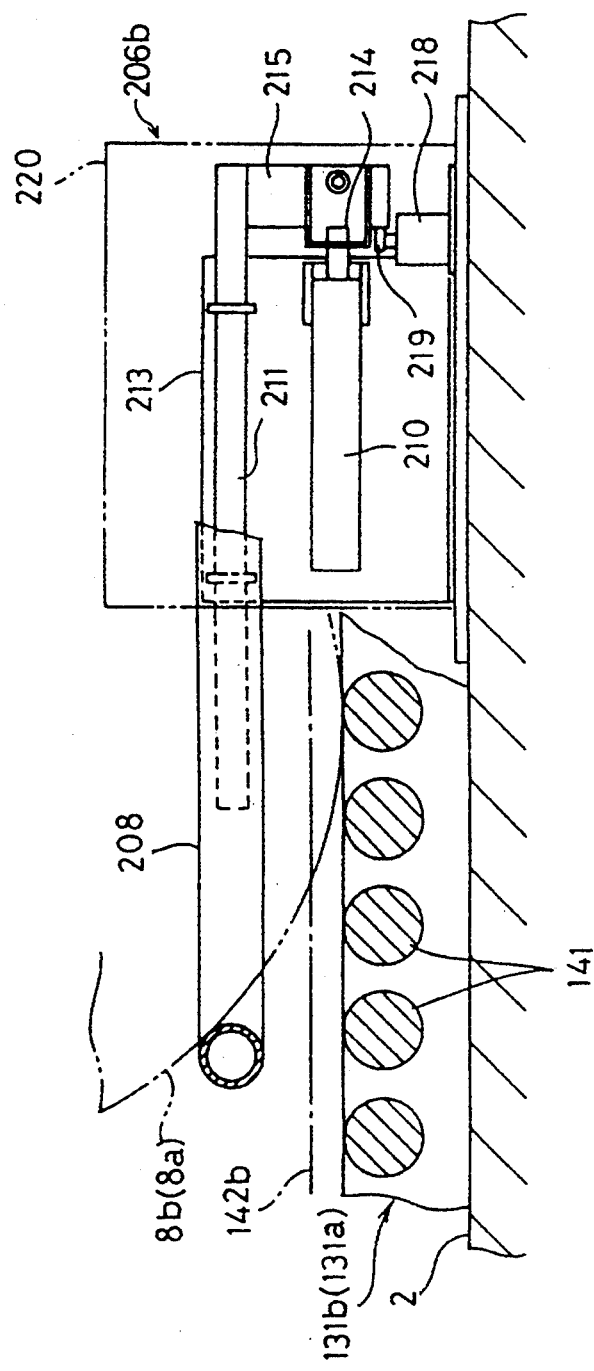
FIG. 35 is a view taken in the direction of arrow X—X in FIG. 34.
Figure 36:
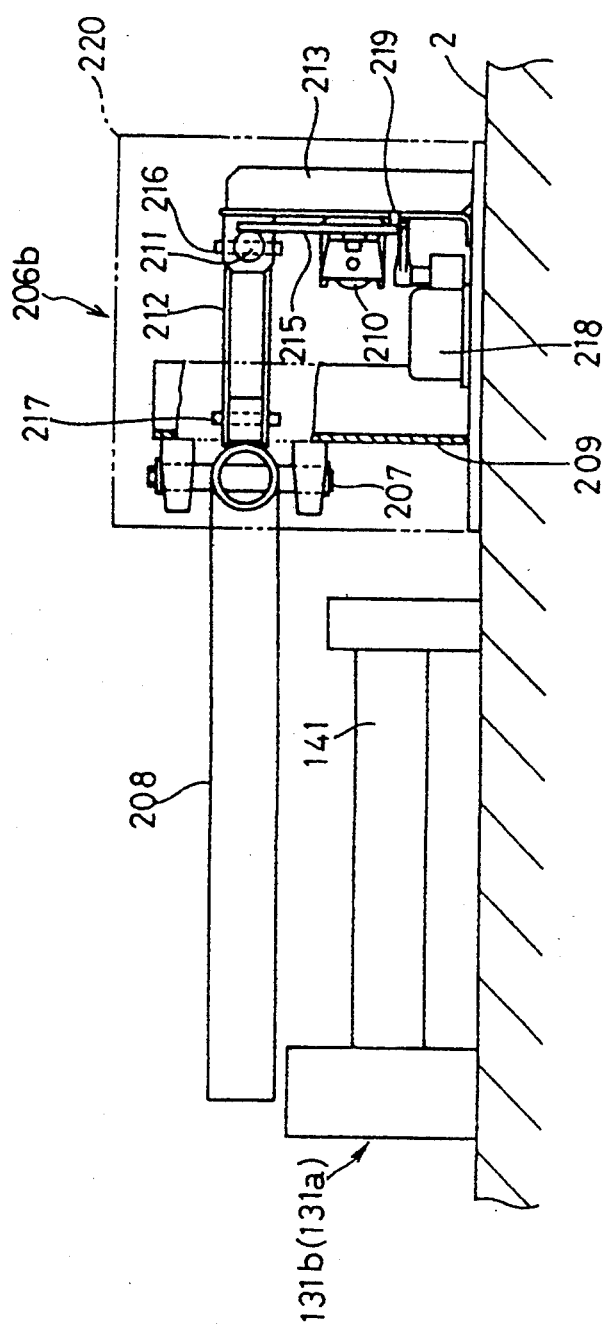
FIG. 36 is a view taken in the direction of arrow Y—Y in FIG. 34.

As shown in FIGS. 34, 35 and 36, the stopping device 206b has a stop arm 208 horizontally rotatable around a vertical shaft 207. This stop arm 208 is L-shaped as seen in plan view and designed so that when it is rotated, it moves onto the transport path 142b of the front conveyor 131b and then leaves the transport path 142b.

The vertical shaft 207 is installed in a bracket 209 erected on the floor 2. The stop arm 208 is rotated by a cylinder device 210 connected to the stop arm 208 by a movable rod 211 and a link 212. That is, the movable rod 211 is attached to a bracket 213 erected on the floor surface 2, so that the movable rod 211 can be moved in the direction of the transport path. One end of the movable rod 211 is connected to the piston rod 214 of the cylinder device 210 by a joint plate 215. Further, the cylinder device 210 is attached to a bracket 213 disposed below the movable rod 211. Further, one end of said link 212 is rotatably connected to the intermediate portion of the movable rod 211 by a pin 216. The other end of the link 212 is rotatably connected to the proximal end of the stop arm 208 by a pin 217.

The lower end of the joint plate 215 is movable into and out of contact with the detecting projection 219 of an explosion-proof limit switch 218. This limit switch 218 detects the extended and retracted positions of the piston rod 214. And the proximal end of the stop arm 208, the cylinder device 210, the movable rod 211, the link 212, and the limit switch 218 are covered by a cover 220.

Further, as shown in FIGS. 1 and 2, said car washing machine body 1 is provided at its front upper region with a vehicle height detecting device 122 (sonic sensor or the like) for detecting the vehicle height, at its front lateral region with a front operating panel 126, and at its rear lateral region with a rear operating panel 127.

Figure 37:
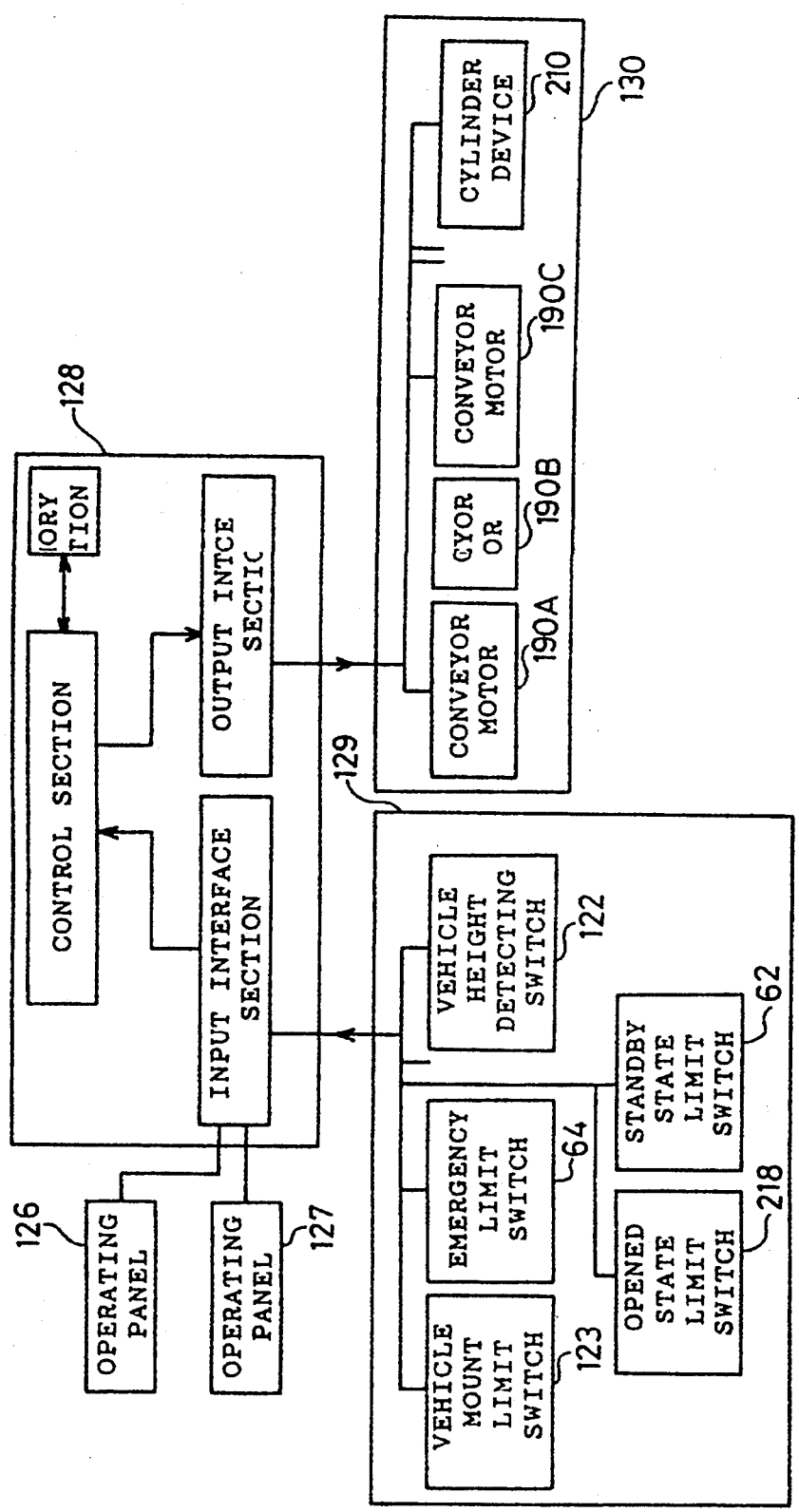
FIG. 37 is a block diagram showing a control system.

FIG. 37 is a block diagram of the control system of the car washing machine body 1.

The control system of the car washing machine is built in the car washing machine body 1 and broadly, it comprises a sensor system 129 including a control device 128 having a microcomputer consisting of an input interface section, an output interface section, a memory section storing data and programs, and a control section, the front operating panel 126, the rear operating panel 127, the vehicle height detecting device 122, the vehicle mount limit switch 123, the standby state detecting limit switch 62 for the side brushes 12a, 12b, the emergency detecting limit switch 64, and the open state detecting limit switch 64, and a driving system 130 including the motors 190A, 190B, 190C and the stopping devices 206a, 206b For the roller conveyors 7a, 7b. The control device 128 inputs and stores operating signals including start and stop signals from the operating panels 126 and 127 and controls said driving system 130 according to said operating signals, thereby controlling the movements of the car washing machine body 1.

The functions of the above arrangement will now be described.

First, the function of the car washing machine body will be described. As shown in phantom lines (S) in FIG. 2, the vehicle 6 to be washed gets on the front conveyors 131a and 131b and stops thereon. Thereafter, the stop arms of the stopping devices 206a and 206b are opened, and the front conveyors 131a, 131b, intermediate conveyors 132a, 132b and rear conveyors 133a, 133b are driven to transport the vehicle 6 rearward. And, at first, the height of the vehicle 6 is detected by the vehicle height detecting device 122.

And, as shown in solid lines in FIG. 3, the swing brushes 10a and 10b are rotated around their respective vertical axes 17 and the link 22 is swung to one side so that one swing brush 10a is separated farthest from the other swing brush 10b.

And the link 22 swings to the other side to bring one swing brush 10a closer to the other swing brush 10b, while the piston of the first cylinder 23 is extended and retracted. Thereby, as shown in phantom lines in FIG. 5, one swing brush 10a abuts against the front region of one lateral surface of the vehicle 6 and the lateral surface of the front wheel 8a and washes one lateral surface and of the vehicle 6 and the lateral surface of the front wheel 8a while longitudinally swinging around the connecting pin 21, as shown in FIG. 4.

Figure 5:
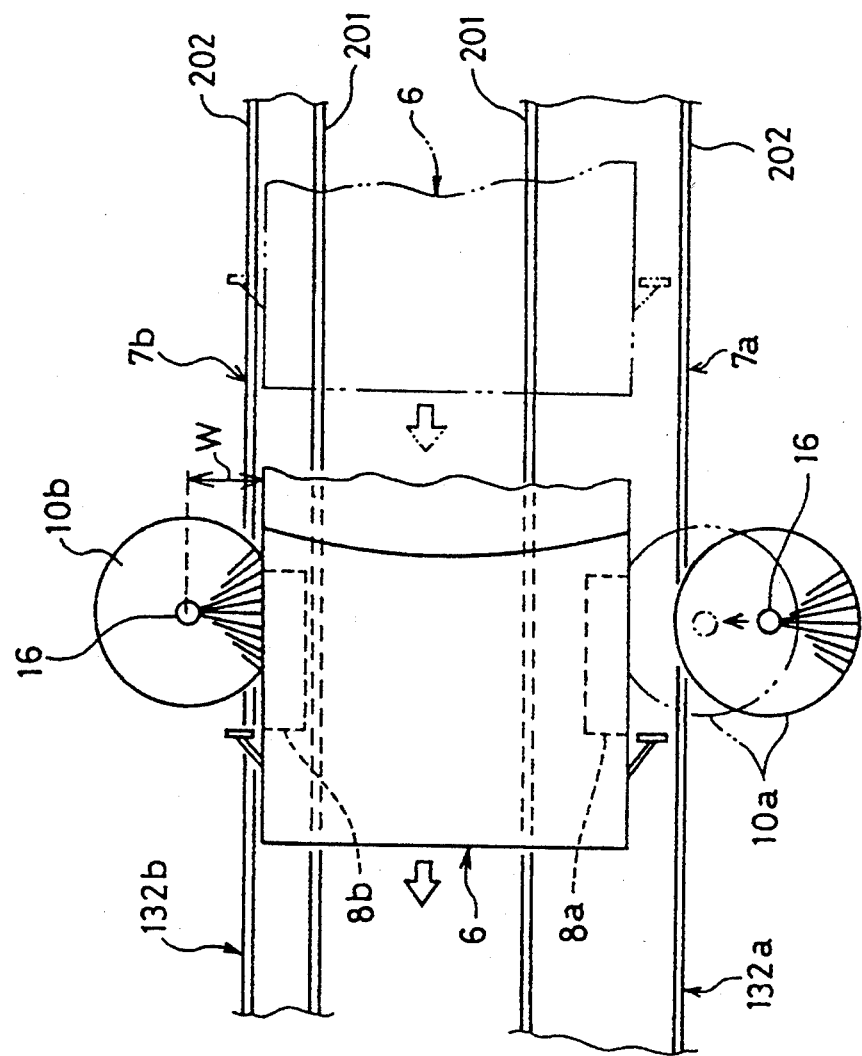
FIG. 5 is a plan view for explaining the operation of the swing brushes.

Further, as shown in FIG. 5, the other swing brush 10b abuts against the other lateral surface of the vehicle 6 and the lateral surface of the front wheel 8b, and while longitudinally swinging around the connecting pin 21 as the piston of the third cylinder 26 is extended and retracted, it washes the front region of the other lateral surface of the vehicle 6 and the lateral surface of the front wheel 8b. At this time, since the vehicle 6 is being transported in the state in which it is positioned on the other side by the other wheel guide bodies 201 and 202, the spacing W between the other swing brush 10b and the other lateral surface of the vehicle 6 is maintained substantially constant.

Thereafter, as shown in FIG. 2, the top brush 11 washes the upper surface of the vehicle 6 while it is lifted and lowered on the basis of the vehicle height detected by the vehicle height detecting device 122.

Thereafter, the side brushes 12a and 12b wash the opposite lateral surfaces and the front and rear surfaces of the vehicle 6.

Figure 13:
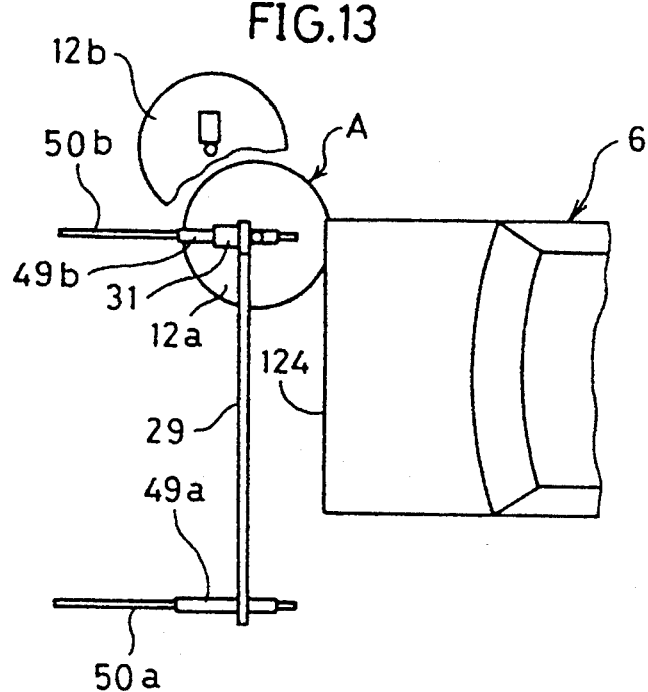
FIGS. 13 through 17 are plan views for explaining the movement of the side brushes.

That is, as shown in FIG. 13, one side brush 12a waits in its standby position A where it is in contact with and somewhat above the other side brush 12b.

Thereafter, the vehicle 6 is transported and the motors 33 and 77 are driven to rotate the side brushes 12a and 12b. And as shown in phantom lines in FIG. 11, when the front surface 124 of the vehicle 6 abuts against one side brush 12a and the latter is thereby pushed back, the vehicle detecting limit switch 63 is turned on, causing forward rotation of the motor 47 which, in turn, causes forward rotation of the chain 44, as shown in FIG. 10. Thereby, the engaging body 45 laterally engages the engaged body 46 to push the latter to one side, with the result that the first movable body 31 is supported and guided to one side by the first rail 29.

Figure 14:
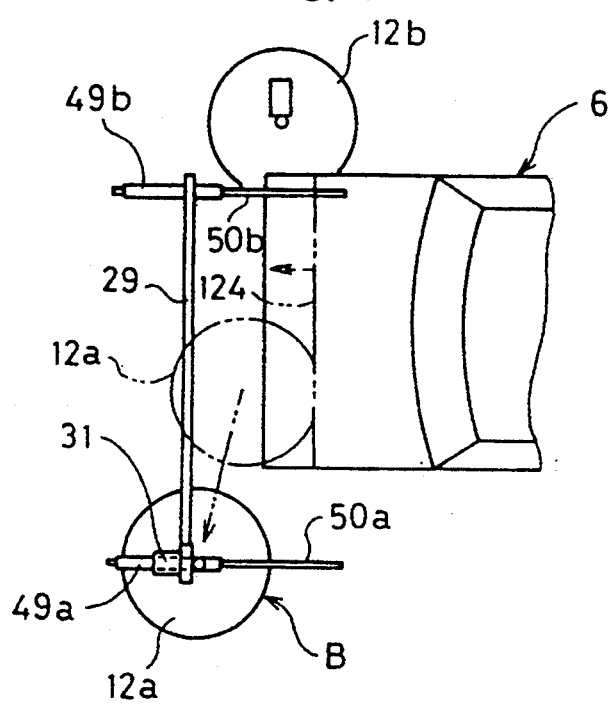

With this movement, as shown in phantom lines in FIG. 8, the piston rod 61 of the air cylinder 60 is extended to lower the lifting pulley 59. The wire 56 is thereby pulled downward, and the other or second movable body 49b is moved rearward as it is supported and guided by the second rail 50b; therefore, the first movable body 31 is moved rearward together with the second movable bodies 49a and 49b and first rail 29. Therefore, as shown in phantom lines in FIG. 14, one side brush 12a moves from the standby position A to one side, away from the other side brush 12b, and washes the front surface 124 of the vehicle 6 while moving rearward at a speed corresponding to the transport speed of the vehicle 6. And, one side brush 12a moves from said standby position A to the front surface washing completion position B which is on one side and a distance L behind.

At this time, if a trouble, such as that the traveling speed of one side brush 12a is lower than the predetermined speed, should happen, one side brush 12a would be moved rearward beyond the given distance L as it would be pushed by the vehicle 6; thus, the emergency detecting limit switch 64 detects one side brush 12a moving beyond the given distance L. Thereby, the front conveyors 131a, 131b and the intermediate conveyors 132a, 132b would make an emergency stop, stopping the transport of the vehicle 6; thus, damage to the front surface 124 and side brush 12a can be prevented. And with the front conveyors 131a and 131b and the intermediate conveyors 132a and 132b stopped in an emergency, one side brush 12a would be moved to one side, farthest away from the other side brush 12b, and then the front conveyors 131a and 131b and the intermediate conveyors 132a and 132b would be driven again.

Figure 15:
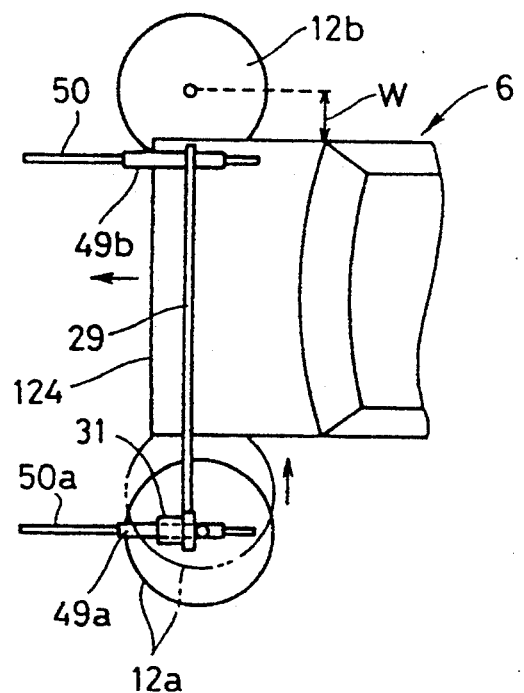

Thereafter, as shown in solid lines in FIG. 8, the piston rod 61 of the air cylinder 61 is retracted. Thereby, the wire 52 is pulled downward by the weight 55, so that the other or second movable body 49b is moved forward as it is supported and guided by the other or second rail 50b; therefore, the first movable body 31 is moved forward together with the second movable bodies 49a and 49b and the first rail 29. Along with this movement, the motor 47 is rotated backward to rotate the chain 44 backward, with the engaging body 45 moving to the other side, away from the engaged body 46. Thereby, the wire 38 is pulled downward by the weight 41, moving the first movable body 31 to the other side as it is supported and guided by the first rail 29. Therefore, one side brush 12a is moved forward from the front surface washing completion position B by the gravity of the weight 55, as shown in solid lines in FIG. 15, and is pressed against the front end of one side of the vehicle 6 by the gravity of the weight 41, as shown in phantom lines in FIG. 15. Further, since the vehicle 6 is being transported as it is positioned on the other side by the other wheel guide bodies 201 and 202, the spacing W between the other lateral surface of the vehicle 6 and the other side brush 12b is maintained substantially constant irrespective of the size of the vehicle 6. Therefore, the other lateral surface of the vehicle 6 abuts against the other side brush 12b. Thereby, one lateral surface of the vehicle 6 is washed by one side brush 12a, while the other lateral surface is washed by the other side brush 12b.

Figure 16:
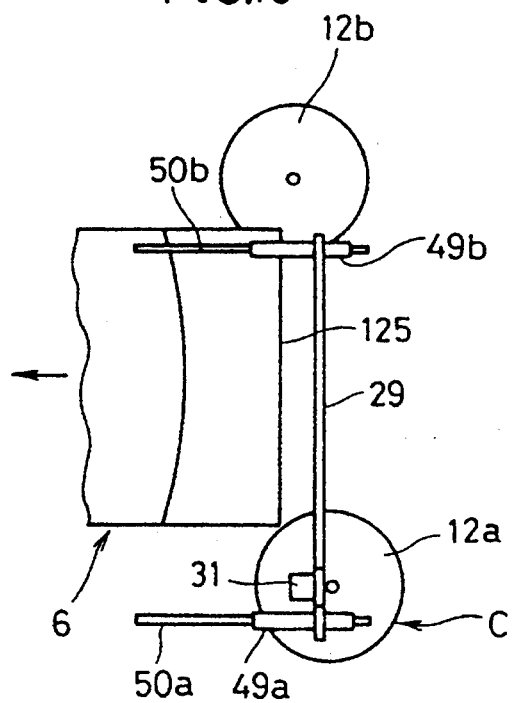
Figure 17:
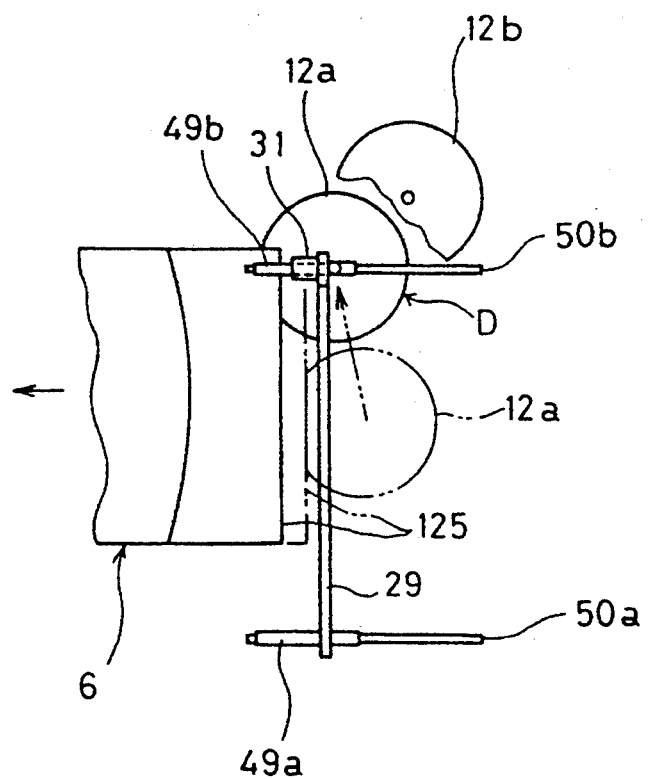

And, as shown in FIG. 16, immediately after the vehicle 6 has passed between the side brushes 12a and 12b, the first movable body 31 is moved to the other side by the gravity of the weight 41, while the piston rod 61 of the air cylinder 60 is extended to move the second movable bodies 49a and 49b rearward. Thereby, as shown in FIGS. 16 and 17, one side brush 12b is moved from the lateral surface washing completion position C to the other side to approach the other side brush 12b and washes the rear surface 125 of the vehicle 6 while moving rearward at a speed corresponding to the transport speed of the vehicle 6. In this manner, one side brush 12a reliably washes the rear surface 125 of the vehicle 6 from one side to the other while running after the rear surface 125 as it is moving rearward at a speed corresponding to the transport speed. Therefore, the rear surface 125 of the vehicle 6 is fully washed over its entire area.

And one side brush 12a comes in contact with the other side brush 12b and moves to the rear surface washing completion position D located somewhat rearwardly of the other side brush 12b. Thereafter, the piston rod 61 of the air cylinder 60 is retracted and the second movable bodies 49a and 49b are moved forward by the gravity of the weight 55. Thereby, one side brush 12a is moved from the rear surface washing completion position D to the standby position A shown in FIG. 13, where it waits for the next vehicle 6 to be washed.

As described above, the lower region of the opposite lateral surface of the vehicle 6 and the lateral surfaces of the wheels 8a, 8b, 9a and 9b are fully washed by the swing brushes 10a and 10b; the opposite lateral surfaces of the vehicle 6 are fully washed by the swing brushes 10a and 10b and the side brushes 12a and 12b; the front and rear surfaces of the vehicle 6 are fully washed by the side brush 12a; and the upper surface of the vehicle 6 is fully washed by the top brush 11. Further, the washing force of the swing brushes 10a and 10b can be increased by longitudinally swinging the swing brushes 10a and 10b and it is possible for the swing brushes 10a and 10b to perform the functions of conventional side and rocker brushes.

Thereafter, as shown in FIG. 2, the vehicle 6 is transported to the waxing section 4, where the top brush 78 applies wax to the upper surface of the vehicle 6 as it is moving upward and downward according to the vehicle height, while the rocker brushes 79a and 79b are rotated around the vertical axes 84 and, as shown in solid lines in FIG. 18, the swing arm 83 swings to one side to move one rocker brush 79b furthest away from the other rocker brush 79b. And when the vehicle 6 is further transported, one rocker brush 79a approaches the other rocker brush 79b, abutting against one lateral surface of the vehicle 6 and the lateral surface of the front wheel 8a to apply wax thereto.

Further, at this time, since the vehicle 6 is being transported in the state in which it is positioned on the other side by the wheel guide bodies 201 and 202, the spacing W between the other rocker brush 79b and the other lateral surface of the vehicle 6 is maintained substantially constant.

Thereafter, as the vehicle 6 is transported rearward, one rocker brush 79a applies wax to an area extending from the front to the rear of one lateral surface and to the rear wheel 9a, while the other rocker brush 79b applies wax to an area extending from the front to the rear of the other lateral surface of the vehicle 6 and also to the rear wheel 9b.

Thereafter, the vehicle 6 is transported to the drying section 5. At this time, as shown in FIG. 19, the first top nozzle 90 is driven to predry the upper surface of the vehicle 6 while moving upward and downward according to the vehicle height detected by the vehicle height detecting device 122 and following the upward and downward movement of the first top nozzle 90, the second top nozzle 91 completely dries the upper surface of the vehicle 8 while moving upward and downward according to the vehicle height detected by the vehicle height detecting device 122. At this time, in operative association with the upward and downward movement of the first top nozzle 90, the lower end of the vinyl sheet 109 is also moved, so that the front portion of the first top nozzle 90 is covered with the vinyl sheet 109 which intercepts splashes of water and liquid wax thrown from the top brush 78 and rocker brushes 79a and 79b. Therefore, splashes of water and liquid wax seldom fly over to the first nozzle 90 and second top nozzle 91. Further, the air spouting downward from the first top nozzle 90 forms an air curtain, Further reducing the danger of splashes of water and liquid wax flying over to the second top nozzle 91 which is operating For complete drying. Thereby, splashes of liquid wax and water are prevented from adhering to the upper surface of the vehicle 6 being dried; therefore, the front region of the vehicle 6 can be fully dried during application of wax to the rear region of the vehicle 6.

Thereafter, as shown in phantom lines in FIG. 22, one side nozzle 92a is pushed out to the other side, and when the sensor sheet 120 for one side nozzle 92a comes into contact with one lateral surface of the vehicle 6 and operates, one side nozzle 92a is pulled back to one side by a predetermined distance. Thereby, the spacing between one side nozzle 92a and one lateral surface of the vehicle 6 is maintained constant, so that one lateral surface of the vehicle 6 is fully dried by one side nozzle 92a. Further, it is possible to eliminate the trouble of one side nozzle 92a abutting against the vehicle 6 to damage the latter.

Further, since the vehicle 6 is being transported in the state in which it is positioned on the other side by the other wheel guide bodies 201 and 202 (see FIG. 25), the spacing W between the other side nozzle 92b and the other lateral surface of the vehicle 6 can be maintained substantially constant irrespective of the vehicle width. Therefore, the other lateral surface of the vehicle 6 is fully dried by the other side nozzle 92b. Further, in the case of a vehicle 6 having a great height, such as a one-box type vehicle, the upper regions of opposite lateral surfaces are dried by the auxiliary side nozzles 93a and 93b and the intermediate and lower regions of said opposite lateral surfaces are dried by the side nozzle 92a and 92b. Thereafter, as shown in phantom line (E) in FIG. 2, the vehicle 6 is discharged rearward through the terminal ends of the conveyors 133a and 133b.

Figure 38:
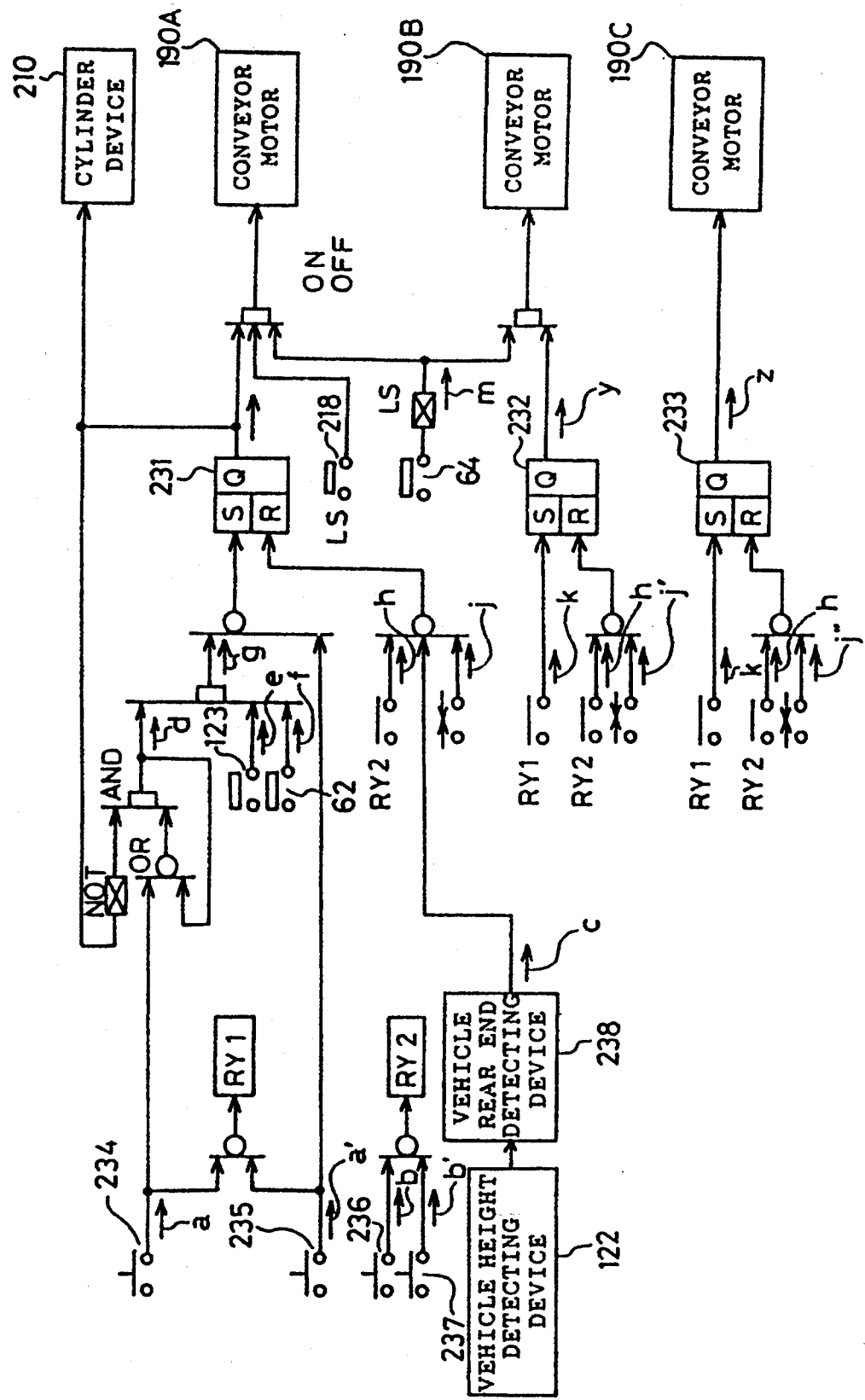
FIG. 38 is a block diagram showing the conveyor control section of the control device.
Figure 39:
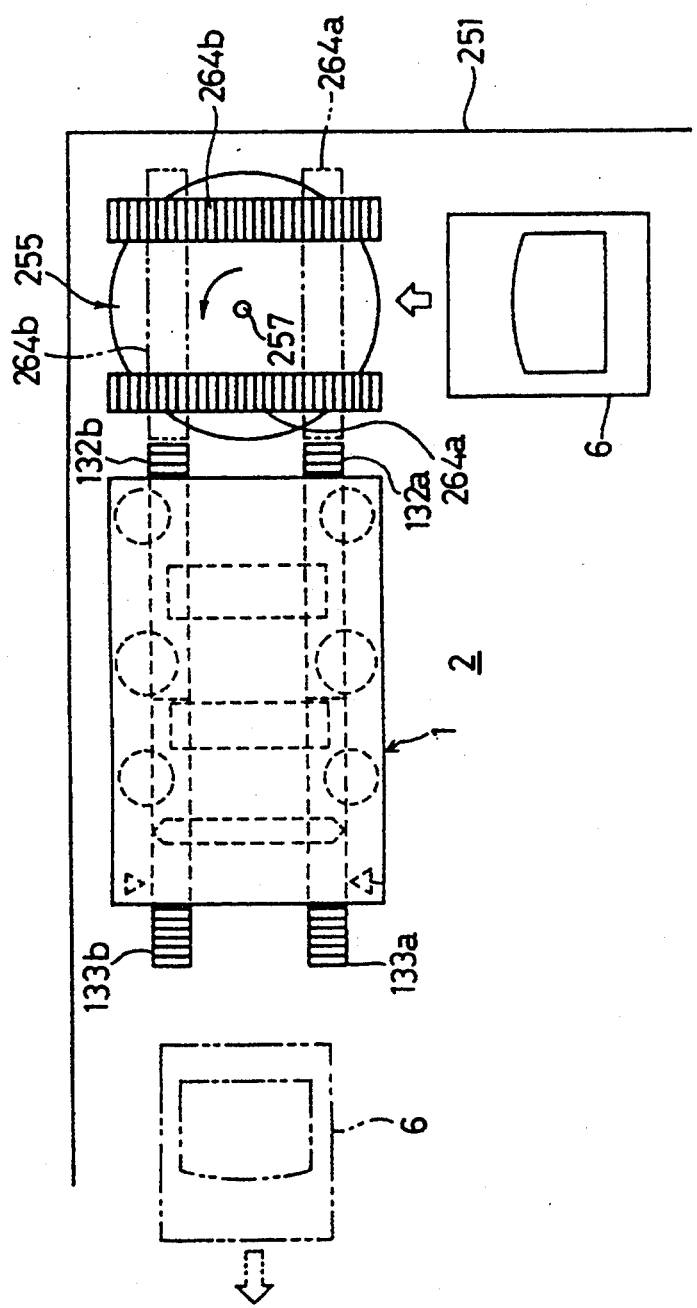
FIG. 39 is a plan view of a car washing machine according to another embodiment of the invention.

The control of the roller conveyors 7a and 7b will now be described in more detail with reference to a block diagram shown in FIG. 38. In addition, it is arranged that drive instructions are transmitted when signals fed to the motors 190A, 190B and 190C are ON ((Hi; high level) and that stop instructions are transmitted when they are OFF (Lo; low level). Further, it is also arranged that when a signal to be fed is ON, it is opening instructions and when they are OFF, it is closing instructions that are transmitted to the cylinder device 210 for the stop arms 208 of the stopping devices 206b and 206a.

Corresponding to the motors 190A, 190B and 190C for the roller conveyors 7a and 7b, there are R-S flip-flops 231 through 233, and there are a relay (RY)1 which operates on the basis of the logical sum (OR) of a start signal a produced by the operation of a start switch 234 on a front operating panel 126 and a start signal a' produced by the operation of a start switch 235 on a rear operating panel 127 and a relay (RY)2 which operates on the basis of the logical sum (OR) of a start signal b produced by the operation of a start switch 236 on the front operating panel 126 and a start signal b' produced by the operation of a start switch 237 on the rear operating panel 127. Further, there is installed a vehicle rear end detecting section 238 adapted to detect the rear end of the vehicle 6 by detecting the floor after the height of the vehicle 6 has been detected by a vehicle height detecting signal from the vehicle height detecting device (sonic sensor) 122, said vehicle rear end detecting section 238 producing a pulse signal c when the vehicle rear end is to be detected.

Further, for the R-S flip-flop 231 of the motor 190A of the front conveyors 131a and 131b, a reverse (NOT) signal which is reverse to an output signal x from this flip-flop 231 is taken as a logical product (AND). There is a hold circuit for said start signal a, and a logical product is made of an output signal d from said hold circuit, an operation signal e from the vehicle mounted limit switch 123, and an operation signal f from the standby state detecting limit switch 62, and a logical sum is made of the output signal g of said logical product and a start signal a' from the start switch 235 on the rear operating panel 127 so as to form a set circuit. Further, a logical sum is made of an operation signal h from the contact of RY2, an output pulse signal c from the vehicle rear end detecting section 238, and a fault signal j from the front conveyors 131a and 131b so as to form a reset circuit. A logical product is made of an output signal x from the R-S flip-flop 231, an output signal from the opened state detecting limit switch 218, and a reverse signal m reverse to an operation signal from the emergency detecting limit switch and is fed to the motor 190A of the front conveyors 131a and 131b. Further, an output signal x from the R-S flip-flop 231 is fed to the cylinder device 210.

Further, for the R-S flip-flop 232 for the motor 190B of the intermediate conveyors 132a and 132b, a set circuit is formed by an operation signal k from the contact of RY1, a logical sum is made of an operation signal h from the contact of RY2 and a fault signal j' from the intermediate conveyors 132a and 132b so as to form a reset circuit, and a logical product is made of an output signal y from the R-S flip-flop 232 and a reverse signal m reverse to an operation signal from the emergency detecting limit switch 64 and is fed to the motor 190B of the intermediate conveyors 132a and 132b.

Further, for the R-S flip-flop 233 for the motor 190C of the rear conveyors 133a and 133b, a set circuit is formed by an operation signal k from the contact of RY1, and a logical sum is made of an operation signal h from the contact of RY2 and a fault signal j" from the rear conveyors 133a and 133b so as to form a reset circuit. The output signal z from this R-S flip-flop 233 is fed to the motor 190C of the rear conveyors 133a and 133b.

The operation of the roller conveyors 7a and 7b will now be described with reference to the block diagram.

(1) First, as shown in phantom lines (S) in FIG. 2, the vehicle 6 is moved forward to get on the pair of front conveyors 131a and 131b from the front slopes 134a and 134b. And, as shown in FIGS. 34 and 35, when the front wheels 8a and 8b abut against the stop arm 208 which has entered the transport path 142, the operator stops the vehicle 6 and applies the side brakes to the rear wheels 9a and 9b for locking. At this time, each stop arm 208 is pushed rearward by the front wheels 8a and 8b and thereby subjected to a load, but since this load is supported by the movable rod 211 through the link 212, it is never applied directly to the piston rod 214. Therefore, even if a high load should act on the stop arm 208, there is no danger of damaging the cylinder device 210. In addition, even if side brakes are applied, the front wheels 8a and 8b are not locked, remaining freely rotatable.

(2) With the side brush 12a disposed in the standby position and the switch 62 in operation, the vehicle 6 moves to the predetermined positions on the front conveyors 131a and 131b, whereupon the vehicle mounted switch 123 is operated. Thereafter, the driver gets off the vehicle 6 and operates the start switch 234 on the front operating panel 126, whereby the RY1 is operated to set the R-S flip-flops 231 through 233, sending an opening instruction to the cylinder device 219 and a start instruction to the motors 190B and 190C, so that the conveyors 132a, 132b, 133a and 133b are started. As shown in phantom lines in FIG. 34, extension of the piston rod 214 of the cylinder device 210 moves the movable rod 211 to one side, rotating the stop arm 208 around the vertical shaft 207 away from the transport path 142. When the opened state detecting limit switch 213 is operated, a start instruction is sent to the motor 190A, starting the conveyors 131a and 131b.

(3) In this state the first vehicle 6 is transferred from the front conveyors 131a and 131b onto the intermediate conveyors 132a and 132b and thereby transported and then transferred from the intermediate conveyors 132a and 132b onto the rear conveyors 133a and 133b and thereby transported. During transport, as described above, it is washed by the washing machine body 1.

(4) Thereafter, the vehicle 6 reaching the terminal ends (E) of the rear conveyors 133a and 133b is further transported and with the front wheels 8a and 8b running idle, it gets down from the rear conveyors 133a and 133b onto the floor 2, and the rear wheels 9a and 9b are pushed out of the terminal ends (E) of the rear conveyors 133a and 133b and onto the rear slopes 135a and 135b. Thereby, as shown in phantom line (E) in FIG. 2, the vehicle 6 this washed stops with its front wheels 8a and 8b positioned on the floor 2 and its rear wheels positioned on the rear slope 35. Thereafter, the driver gets on the vehicle 6 and releases the brakes, advancing the vehicle 6, away from the rear slope 135.

(5) Further, when the vehicle rear end detecting section 238 is operated, the R-S flip-flop 231 is reset, sending a closing instruction to the cylinder device 210 to close the stop arm 208 and a stop instruction to the motor 190A of the front conveyors 131a and 131b, whereby the front conveyors 131a and 131b are stopped.

(6) When the front conveyors 131a and 131b are stopped, the vehicle 6 is driven into the front conveyors 131a and 131b, whereby the vehicle mounted limit switch 123 is operated again and then the start switch 234 on the front operating panel 126 is operated, so that its signal is held. Further, the vehicle 6 is washed in the washing section 3 as it is transported by the intermediate conveyors 132a and 132b. When the side brush 12b finishes washing the rear surface, it returns to the standby position. When the standby state detecting limit switch 218 is operated, the R-S flip-flop 231 is set again, sending an opening instruction to the cylinder device 210 which then opens the stop arm 208. When the opened state detecting limit switch 218 is operated, a start instruction is sent to the motor 190A, starting the front conveyors 131a and 131b again.

(7) Further, when the start switch 235 on the rear operating panel 127 is operated, all R-S flip-flops 231 through 233 are set and an opening instruction is sent to the cylinder device 210 to open the stop arm 208, sending a start instruction to each of the motors 190A, 190B and 190C, so that the conveyors 131a, 131b, 132a, 132b, 133a and 133b are started. When the stop switches 236 and 237 on the front or rear operating panel 126 or 127 are operated, all R-S flip-flops 231 through 233 are reset and a closing instruction is sent to the cylinder device 210 to close the stop arm 208, sending a stop instruction to each of the motors 190A, 190B and 190C, so that the conveyors 131a, 131b, 132a, 132b, 133a and 133b are stopped.

(8) Further, during the operation of the emergency detecting limit switch 64 for the side brushes 12a and 12b, that is, during the side brush 12a being pushed to the rear end limit position by the vehicle 6, the output signals to the motors 190A and 190A are OFF, so that the front conveyors 131a and 131b and the intermediate conveyors 132a and 132b are stopped.

When the vehicle 6 is transferred from the front conveyors 131a and 131b to the intermediate conveyors 132a and 132b by the driving of the roller conveyors 7a and 7b and the rear end of the vehicle 6 is detected, the start switch 234 is operated. Because of this switch operation and the stoppage of the front conveyors 131a and 131b until they are driven upon completion of the washing of the vehicle 6 by the washing section 3, the driving of the vehicle 6 into the front conveyors 131a and 131b is facilitated. Further, even if a trouble occurs in the intermediate conveyors 132a and 132b, the rear conveyors 133a and 133b can be driven, thus solving the problem of a plurality of vehicles 6 being left within the car washing machine body 1. Further, by stopping the front conveyors 131a and 131b and the intermediate conveyors 132a and 132b during the operation of the emergency detecting limit switch 64, the side brush 12a can be prevented from being damaged as it is pushed by the vehicle 6, even if the rearward movement of the side brush 12a by the longitudinal driving mechanism is delayed.

Further, since the rear wheels 9a and 9b of the vehicle 6 are not locked, even if a trouble should occur which stops the front conveyors 131a and 131b, intermediate conveyors 132a and 132b or rear conveyors 133a and 133b, the vehicle 6 on these conveyors would also stop, thus eliminating the danger of the vehicle continuing forward movement by inertia; therefore, safety is improved. Since the rear wheels 9a and 9b of the vehicle 6 are locked, the vehicle can be prevented from such accidental displacement as caused by the conditions of the floor 2 (slopes in the front-and-rear and right-and left directions) or by the reactions of the brushes during the car washing process. Therefore, the expected car washing can always be performed smoothly.

Further, as shown in FIG. 25, the front and rear wheels 8a, 8b and 9a, 9b of the vehicle 6 are guided by the guide surfaces 204 of the wheel guide bodies and transported along the transport path 142. Thereby, during transport, the vehicle 6 to be washed is prevented from derailing from the conveyors 7a and 7b. Further, as shown in phantom lines in FIG. 25, during washing by the two swing brushes 10a and 10b, since the attachment level of H1 from the transport surface of the outer wheel guide body 202 is lower than the attachment level H2 of the inner wheel guide body 201, there is no possibility of the outer wheel guide body 202 interfering with the two swing brushes 10a and 10b. Therefore, the lateral surfaces of the wheels 8a, 8b, 9a, 9b are fully washed as far as their lower regions by the swing brushes 10a and 10b.

The vehicle 6 which has reached the rear conveyors 133a and 133b is further transported rearward and the front wheels 8a and 8b are descended from the rear slopes 135a and 135b onto the floor 2 while running idle, and subsequently the rear wheels 9a and 9b are pushed out from the terminal ends of the rear conveyors 133a and 133b onto the rear slopes 135a and 135b. As a result, as shown by the phantom line in FIG. 2, the vehicle 6 stops with its front wheels 8a and 8b positioned on the floor 2 and the rear wheels 9a and 9b on the rear slopes 135a and 135b. Since the rear wheels 9a and 9b positioned on the rear slopes 135a and 135b are brake-locked, the vehicle 6 which has been washed is not caused to run by itself by the slopes at the outlet port, presenting no danger at all. Afterwards, a driver gets on the vehicle 6 and releases the parking brakes to free the rear wheels 9a and 9b. By this, the vehicle can move forward and depart from the rear slopes 135a and 135b. Since the front wheels 9a and 9b have been already placed on the floor 2 by this moment, the vehicle can depart from the outlet port immediately with it wheels steered to the right or the left, which means the washing machine according to the present invention can be installed even where the space allotted to the outside of the exit is small.

The vehicle 6 is moved forward continuously without a halt, so that there is no threat that such washing means as water spray nozzles 13 and 14 work locally on a certain portion of the vehicle 6, promising a preferable uniform car washing all the time.

In case any of such washing means as the roller conveyors 7a and 7b or each brushes 10a, 10b, 11, 12a, 12b, 78, 79a and 79b have gone out of order, a driver gets on the vehicle in the midway of the washing process and releases the parking brakes to unlock the rear wheels 9a and 9b, subsequently driving the vehicle forward. In this case, the vehicle can be driven forward easily on the flat roller conveyors 7a and 7b.

In the above embodiment, as shown in FIG. 1, the width W1 of the transport surface of one roller conveyor 7a is sufficiently large to accommodate various vehicle widths, while the width W2 of the transport surface of the other roller conveyor 7b is small, so that if the driver drives the vehicle to bring the other front wheel 8b in alignment with the initial end (S) of the other front conveyor 131b, then one front wheel 8a gets on the initial end (S) of one front conveyor 131b. In this manner, using the other front conveyor 131b as a reference makes it possible for vehicles 6 of various widths to get on the front conveyors 131a and 131b easily and reliably.

Further, in the above embodiment, as shown in FIG. 24, since the front conveyors 131a, 131b, the intermediate conveyors 232a, 132b, and the rear conveyors 133a, 133b are driven by the motors 190A, 190B, 190C, the vehicle 6 can be smoothly transported without being deviated.

In addition, controlling the respective speeds of the motors 190A, 19B, 190C controls the transport speeds of the front conveyors 131a, 131b, the intermediate conveyors 132a, 132b and the rear conveyors 133a, 133b such that they are the same or one of them is highest or lowest. Thereby, in the case where the vehicle 6 is extremely soiled, the washing may be carefully performed by decelerating the intermediate conveyors 132a, 132b and the rear conveyors 133a, 13b. Further, in the case where it is desired to wax the vehicle 6 carefully, this may be achieved by decelerating the intermediate conveyors 132a, 132b and the rear conveyors 133a, 133b or where it is desired to dry the vehicle 6 carefully, this may be achieved by decelerating the rear conveyors 133a, 133b. Further, in the case where the vehicle 6 is present on the rear conveyors 133a, 133b, the latter may be stopped for the vehicle 6 to stand by. Further, in the case where the vehicle height detecting device 122 finds that the height of the vehicle 6 is greater than the width of the car washing machine body 1 so that the vehicle 6 cannot be washed or in the case where a trouble occurs in the drying section 5 so that the vehicle cannot be carried out, the motors 190A, 190B, 190C may be reversed to carry the vehicle 6 out through the front. Instead of locking the rear wheels 9a and 9b by actuating the parking brakes (side brakes), such embodiemnts are also possible as to shift the transmsision gear of an automatic transmission system to a driving or a parking position, to lock the front wheels of a front-wheel drive vehicle, or to lock all the wheels of a four-wheel drive vehicle.

Further, in the case where there is a wall in front of the front conveyors 131a, 131b, the vehicle 6 is moved from one lateral side to the front of the car washing machine body 1 and then the space between the car washing machine body 1 and the wall is utilized to turn the vehicle through approximately 90 degrees toward the front of the car washing machine body 1, so as to allow the vehicle to get on the initial ends of the front conveyors 131a, 131b. However, if the space is narrow, it would be very difficult for the vehicle 6 to change its direction of movement. To solve this problem, as shown in FIG. 29, the front conveyors 131a, 131b are removed and instead a front turntable 255 is installed in front of the intermediate conveyors 132a, 132b. The arrangement of this front turntable 255 will now be described with reference to FIGS. 40 through 42.

The front turntable 255 comprises a base plate 256 and a vertical shaft 257 erected on the floor 2 and rotatably supporting the base plate 256. A pillow type bearing unit (not shown) is installed between the base plate 256 and the vertical shaft 257. The front turntable 255 is provided with a plurality of support rollers 259 and an annular support rail 260 on which these support rollers freely roll is laid on the floor 2. Thereby, the front turntable 255 rotates around the vertical shaft 257 as it is supported and guided by the support rail 260 through support rollers 259. Further, a driving frame 261 which is annular as seen in plan view is attached to the outer side of the front turntable 257 over an arc of about 90 degrees. This driving frame 261 is held by a pair of rollers 252 and 253. Of these rollers, the outer roller 252 abutting against the outer lateral surface of the driving frame 261 has connected thereto a motor 254 for rotating the front turntable 255. Further, the inner roller 253 abutting against the inner lateral surface of the driving frame 261 is placed on the floor 2 for free rotation.

Installed on the front turntable 255 are a pair of auxiliary roller conveyors 264a and 264b (an example of a transporting device) connectible to a pair of intermediate conveyors 132a and 133b. The auxiliary roller conveyors 264a and 264b are disposed on the upper surface of the base plate 256 such that they are movable in the direction of the transport path 264a and 264b of the auxiliary roller conveyors 264a and 264b.

That is, installed on the upper surface of said base plate 265 are a pair of L-shaped rails 266a which are parallel to the transport path 265a of one auxiliary roller conveyor 264a, and a pair of L-shaped rails 266b which are parallel to the transport path 265b of the other auxiliary roller conveyor 264b. Further, a pair of conveyor frames 268 for one auxiliary roller conveyor 264a and a pair of conveyor frames 268 for the other auxiliary roller conveyor 264b each have a pair of freely rotatable rollers 269 attached thereto. Thereby, one auxiliary roller conveyor 264a moves in the direction of the transport path 265a as it is supported and guided by the rail 266a through the rollers 269. Further, the other auxiliary roller conveyor 264b moves in the direction of the transport path 265a as it is supported and guided by the rail 266b through the rollers 269.

One auxiliary roller conveyors 264a and the other auxiliary roller conveyor 264b are connected together by a plurality of connecting members 270. Of these connecting members, a central one 270 has connected thereto the piston rod 272 of a cylinder device 271 which is an example of a driving device for driving the two auxiliary roller conveyors 264a and 264b and the main body of said cylinder device 271 is attached to the base plate 256.

The other auxiliary roller conveyor 264b has connected thereto a driving motor 273 and the two auxiliary conveyors 264a and 264b are connected together by a driving shaft 274. The motor 273 drives the other auxiliary roller conveyor 264b and simultaneously drives one auxiliary roller conveyor 264a through the driving shaft 274. Further, installed on the floor 2 are a pair of stops 275 for the vehicle 6 getting on the two auxiliary roller conveyors 264a and 264b. Further, a slop 276 is installed on the upper surface of the base plate 256 to make it possible for the vehicle 6 to smoothly get on the auxiliary roller conveyors 264a and 264b.

The operation of the turntable 255 arranged in the manner described above will now be described.

Figure 42:
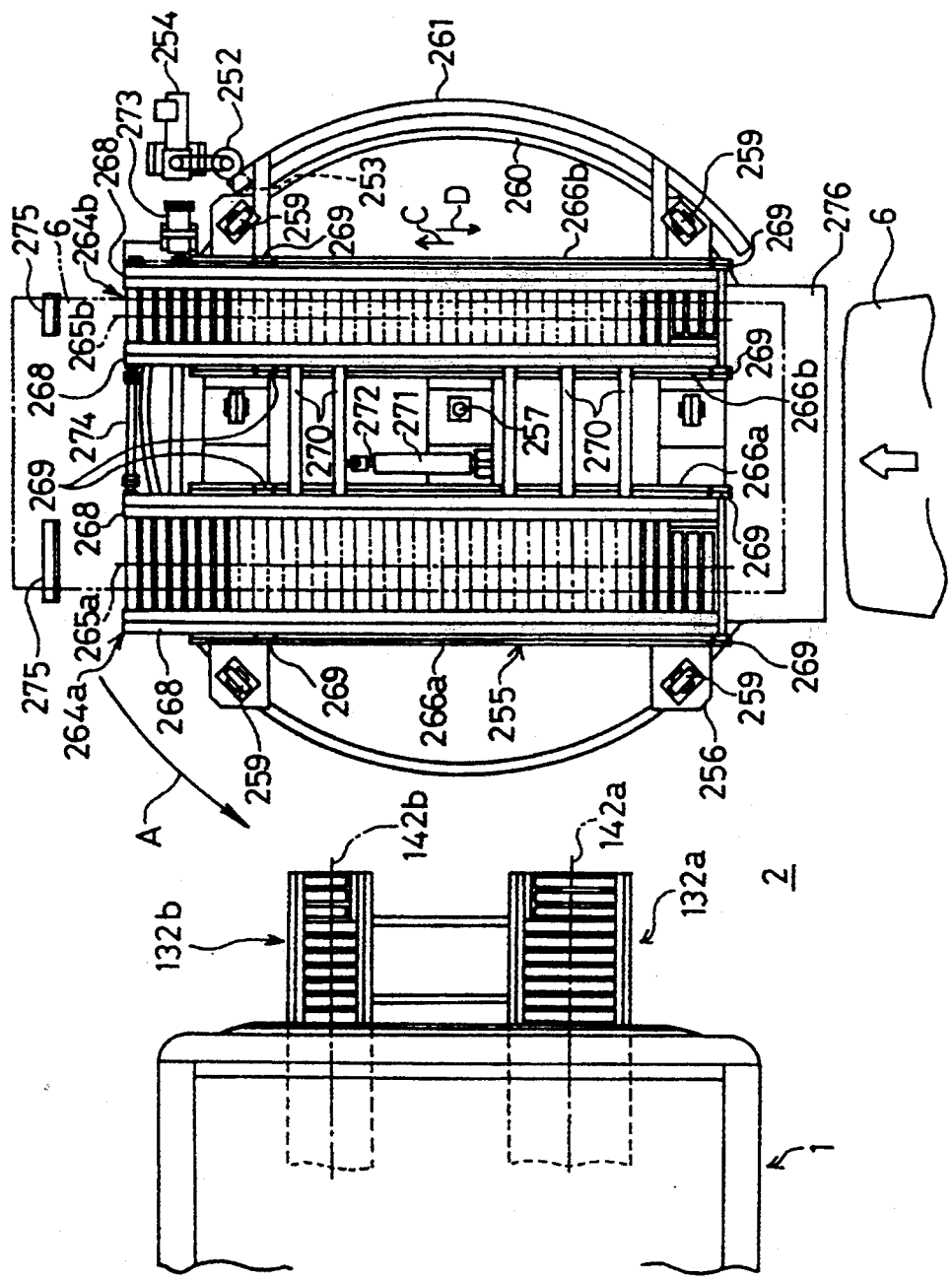
FIG. 42 is a plan view of the front turntable waiting for car washing.

The contraction of the piston rod of the cylinder device 271, as shown in phantom lines in FIG. 42, moves the two auxiliary roller conveyors 264a and 264b to one side D of the transport paths 265a and 265b.

Thereafter, the driver drives the vehicle 6 to get on the two auxiliary roller conveyors 264a and 264b from the slope 276 and stops the vehicle 6. At this time, the driver is allowed to ascertain the stop position of the vehicle 6 by means of the stops 275. And, the motor 254 is driven to rotate the outer roller 252, rotating the front turntable 255 in the direction of A through 90 degrees. At this time, the load of the vehicle 6 on the front turntable 255 is supported by the support rail through the support rollers 259.

Figure 40:
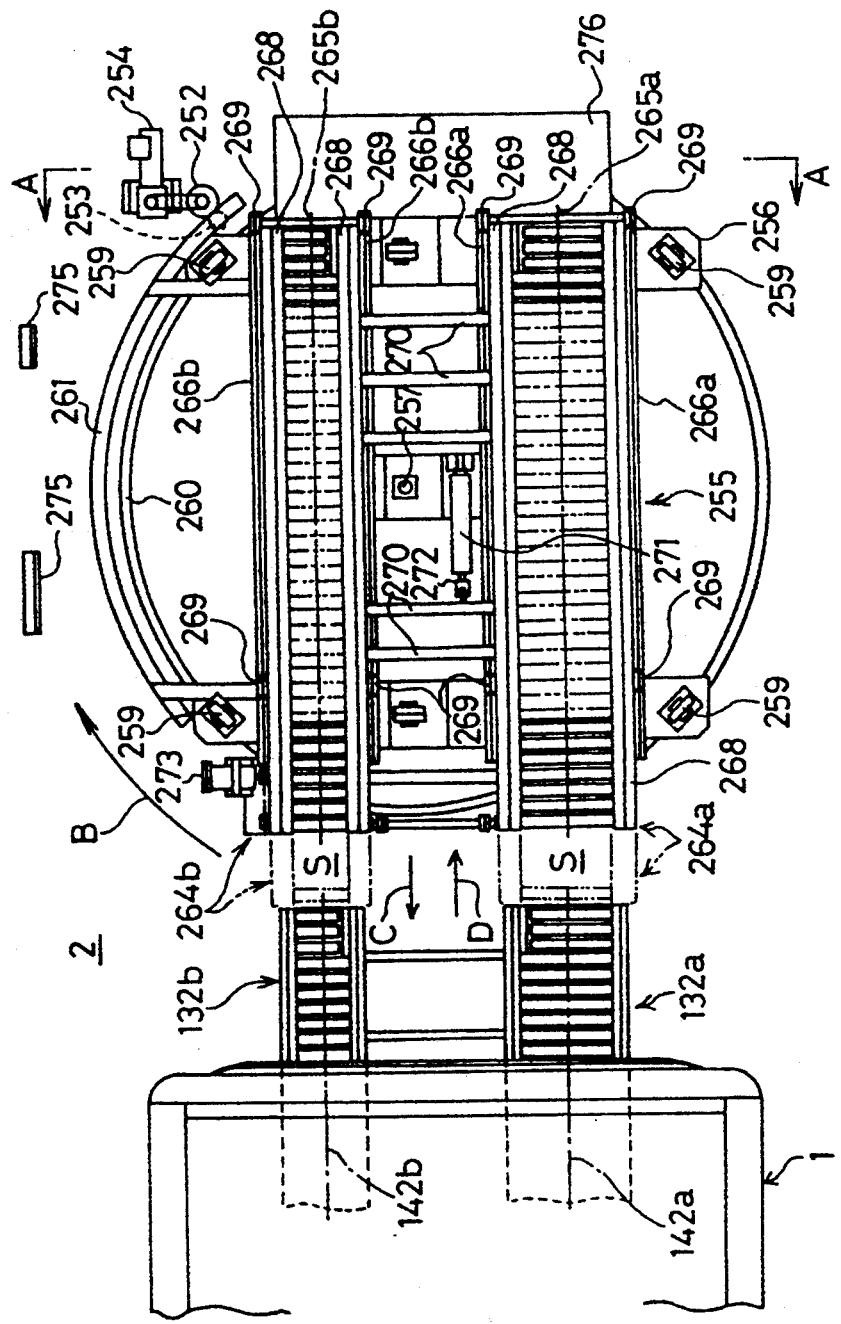
FIG. 40 is a plan view of a front turntable in FIG. 39.

Thereby, as shown in FIG. 40, the transport path 265a for one auxiliary roller 264a takes the same direction as that of the transport path 142a for the intermediate conveyor 132a, while the transport path 265b for the other auxiliary roller 264b takes the same direction as that of the transport path 142b for the intermediate conveyor 132. At this times, since the two auxiliary roller conveyors 264a and 264b are moving to one side of the transport paths 265a and 265b, there is a clearance S between the initial end of one intermediate conveyor 132a and the terminal end of one roller conveyor 264a and also between the initial end of the other intermediate conveyor 132b and the terminal end of the other auxiliary roller conveyor 264b. This arrangement prevents an accident in which the other ends (or terminal ends) of the auxiliary roller conveyors 264a and 264b dash against one of the respective ends (or initial ends) of the intermediate roller conveyors 132a and 132b during the rotation of the front turntable 255, involving damage.

Thereafter, the extension of the piston rod 272 of the cylinder device 271 moves the auxiliary roller conveyors 264a and 264b to the other side C of the transport paths 265a and 265b and the terminal end of one auxiliary roller conveyor 264a connects to the initial end of one intermediate conveyor 132a and the terminal end of the other auxiliary conveyor 264b connects to the initial end of the other intermediate conveyor 264b.

Thereafter, the motor 273 is driven to move the two auxiliary roller conveyors 264a and 264b so that the vehicle 6 is transported from the auxiliary roller conveyors 264a and 264b to the intermediate conveyors 142a and 142b. And the vehicle 6 is washed in the car washing machine body 1 as it is transported on the intermediate conveyors 132a and 132b, until it is discharged from the terminal end of the rear conveyors 133a and 133b onto the floor 2.

Thereafter, the piston rod 272 of the cylinder device 271 is contracted, whereby, as shown in solid lines in FIG. 40, the auxiliary roller conveyors 264a and 254b are moved to one side D of the transport paths 265a and 265b so that the terminal end of one auxiliary roller conveyor 264a is separated from the initial end of one intermediate conveyor 132a and the terminal end of the other auxiliary roller conveyor 264b is separated from the initial end of the other intermediate conveyor 132b. In this state, when the turntable 255 is rotated through 90 degrees in the B direction, the preparation for the next car washing is completed, as shown in FIG. 42. In this case, there is a clearance S between the initial end of one intermediate conveyor 132a and the terminal end of one auxiliary roller conveyor 264a and also between the initial end of the other intermediate conveyor 132b and the terminal end of the other auxiliary roller conveyor 264b. This arrangement prevents an accident in which the other ends (or terminal ends) of the auxiliary roller conveyors 264a and 264b dash against one of the respective ends (or initial ends) of the intermediate roller conveyors 132a and 132b during the rotation of the front turntable 255, involving damage.

Figure 41:
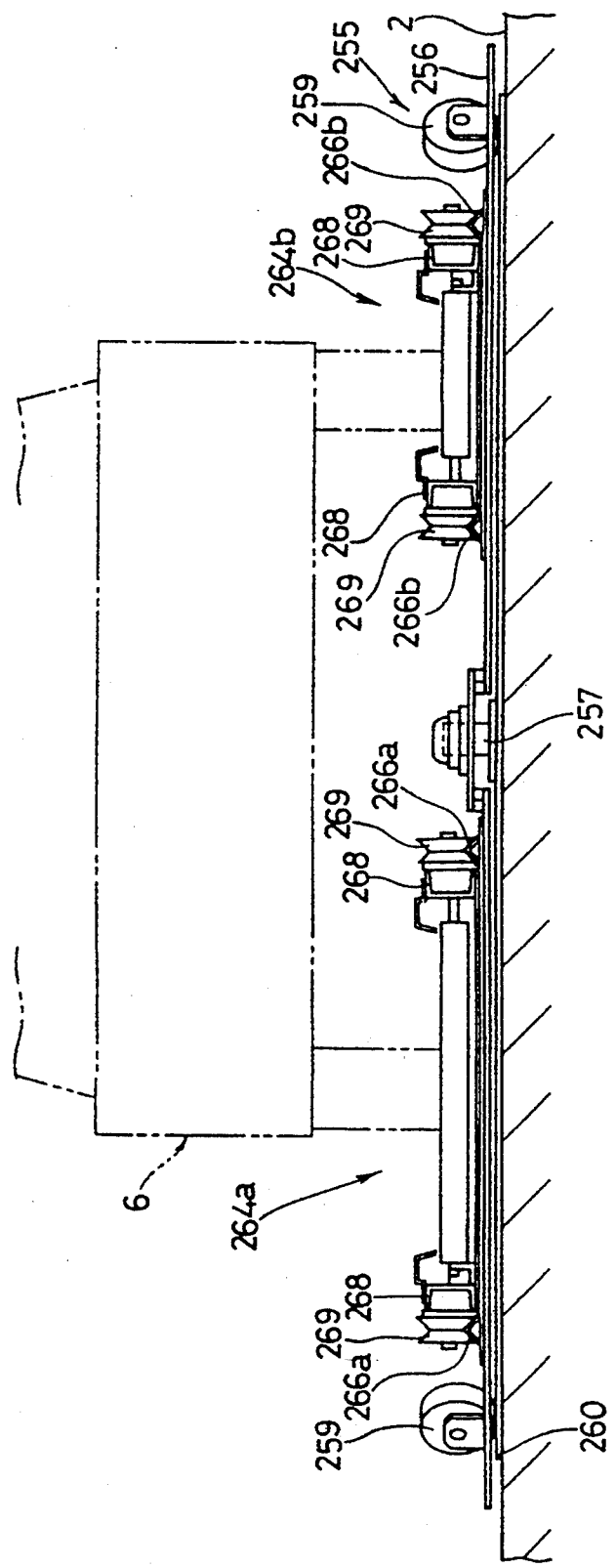
FIG. 41 is a view taken in the direction of arrow A—A in FIG. 40.

As described above, the positioning of the front turntable 255 in front of the intermediate conveyors 132a and 132b allows the front turntable 255 to change the direction of movement of the vehicle 6 even if there is an obstacle such as the wall 252 in front of the car washing machine body 1 with a narrow space between the car washing machine body 1 and the wall 251. Therefore, even in such place, the car washing machine can be installed. Further, as shown in FIG. 41, the front turntable 255 can be installed without having to form a turntable receiving pit in the floor 2; thus, the installation work is easy.

In an embodiment shown in FIGS. 39 through 42, a roller conveyor is installed as an example of a device for transporting a vehicle 6 to be washed; however, a belt conveyor or a chain conveyor may be used. Further, the auxiliary roller conveyors 264a and 264b may be dispensed with and a turntable alone may be installed. Thus, after the direction is changed by the turntable, the vehicle is driven to get on the intermediate conveyors 132a and 132b.

Similarly, as shown in FIG. 43, in the case where there is a wall 251 in rear of the car washing machine body 1, it is very difficult for the vehicle 6 to change its direction of movement. Therefore, a rear turntable 278 is installed in rear of the rear conveyors 133a and 133b. According to this arrangement, the vehicle 6 is transferred from the terminal ends of the rear conveyors 133a and 133b to the rear turntable 278. Thereafter, the rear turntable 278 is rotated to change the direction of movement of the vehicle 6 to the predetermined one. And the driver drives the vehicle 6 to move the latter from the rear turntable 278 to the floor 2.

As described above, the positioning of the rear turntable 278 in rear of the rear conveyors 133a and 133b allows the rear turntable 278 to change the direction of movement of the vehicle 6 even if there is an obstacle such as the wall 251 in rear of the car washing machine body 1 to define a narrow space between the car washing machine body 1 and the wall 251. Therefore, even in such place, the car washing machine can be installed.

In addition, the auxiliary roller conveyors 264a and 264b may be installed on the rear turntable 278 as in the case of the front turntable 255.

Further, as shown in FIG. 44, in the case where there are walls 251 in front and rear of the car washing machine body 1, the front turntable 255 will be installed in front of the intermediate conveyors 132a and 132b and the rear turntable 278 in rear of the rear conveyors 133a and 133b. According to this arrangement, the direction of movement of the vehicle 6 can be easily changed by the front and rear turntables 255 and 273; thus, the car washing machine can be installed even in such place.

What is claimed is:

1. A car washing machine comprising a tunnel-shaped stationary type car washing machine body provided with means of washing a vehicle and installed on the floor, and a pair of roller conveyors for transporting said vehicle from the front into the car washing machine body and to the rear out of the car washing machine body, said roller conveyors supporting and transferring the vehicle through locked wheels.

2. A car washing machine as set forth in claim 1, wherein the roller conveyors support and transfer the vehicle through locked wheels, said locked wheels being at least a rear wheel.

3. A car washing machine as set forth in claim 1, wherein each roller conveyor comprises a plurality of rollers rotatably supported on the conveyor frame and each having a sprocket fixed on one end of the roller, and a chain for driving said sprockets with the upper regions of said sprockets serving as forward and backward paths for the chain.

4. A car washing machine as set forth in claim 1, wherein the pair of conveyors are juxtaposed, right and left, with one conveyor supporting the wheels on one side of the vehicle and the other conveyor supporting the wheels on the other side, said conveyors being provided with a driving device for driving at least one of the conveyors.

5. A car washing machine as set forth in claim 4, wherein the roller conveyors guide the vehicle, with one conveyor serving as a reference, and the width of the conveyor guiding the vehicle is less than that of the other.

6. A car washing machine as set forth in claim 4, wherein the stationary type car washing machine body is installed with brushes for washing lateral surfaces of the wheels of the vehicle, and wheel guide bodies are disposed on opposite sides of each conveyor, said wheel guide body on the outer side of each conveyor, at least a portion thereof corresponding to the brush being formed to be lower than the inner wheel guide body.

7. A car washing machine as set forth in claim 4, wherein each conveyor is divided into a plurality of sections and a driving device is provided for driving each section.

8. A car washing machine comprising a tunnel-shaped stationary type car washing machine body installed on the floor, said car washing machine body having for a vehicle to be washed a washing section in the front region thereof, a waxing section in the intermediate region thereof and a drying section in the rear region thereof, and a pair of juxtaposed conveyors installed on the floor for transporting a vehicle to be washed from the front into the car washing machine body and for transporting said vehicle to the rear out of the car washing machine body with one conveyor supporting the wheels on one side of said vehicle and the other conveyor supporting the wheels on the other side of said vehicle, said vehicle being guided with one conveyor serving as a reference.

9. A car washing machine as set forth in claim 8, wherein each conveyor comprises a carrying-in conveyor for carrying the vehicle into the car washing machine body, an intermediate conveyor for moving said vehicle across the position of installation of said washing section, and a carrying-out conveyor for moving said vehicle across the positions of installation of said waxing section and drying section for carrying the vehicle out, further comprising a control device for driving said carrying-in conveyor in response to the completion of washing of said vehicle at said washing section.

10. A car washing machine as set forth in claim 8, wherein the washing section is provided with a pair of swing brushes each provided on respective side and rotating around a vertical shaft which is longitudinally swingable, at least one swing brush being movable toward and away from the other swing brush.

11. A car washing machine as set forth in claim 8, wherein the washing section is provided with a pair of side brushes each provided on respective side, one side brush being movable toward and away from the other opposed side brush and being longitudinally movable.

12. A car washing machine as set forth in claim 8, including a vehicle detecting device for detecting a vehicle abutting against one side brush, and an emergency detecting device for detecting one side brush moving beyond a given range when said one side brush is pushed by the vehicle.

13. A car washing machine as set forth in claim 8, wherein the drying section is provided with a top nozzle for drying the upper surface of the vehicle, and an auxiliary top nozzle is disposed between said top nozzle and the waxing section.

14. A car washing machine as set forth in claim 8, wherein the drying section is provided with a top nozzle for drying the upper surface of the vehicle, and a waterproof screen is disposed between said top nozzle and the waxing section, said waterproof screen being movable upward and downward in operative connection with said top nozzle.

15. A car washing machine as set forth in claim 8, including an operating panel installed at each of the vehicle inlet and outlet ports of the stationary type car washing machine body.

16. A car washing machine as set forth in claim 8, including a turntable for changing the direction of movement of the vehicle installed outside of at least either the front or the rear of the stationary type car washing machine.

17. A car washing machine as set forth in claim 16, wherein the turntable is provided with conveyors which are connectible to the conveyors of the stationary type car washing machine.

* * * * *